US010680805B2

(12) United States Patent
Le Saint

(10) Patent No.: US 10,680,805 B2
(45) Date of Patent: Jun. 9, 2020

(54) DATA ENCRYPTION CONTROL USING MULTIPLE CONTROLLING AUTHORITIES

(71) Applicant: Visa International Service Association, San Francisco, CA (US)

(72) Inventor: Eric Le Saint, Los Alto, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/335,501

(22) PCT Filed: Nov. 4, 2016

(86) PCT No.: PCT/US2016/060656
§ 371 (c)(1),
(2) Date: Mar. 21, 2019

(87) PCT Pub. No.: WO2018/084859
PCT Pub. Date: May 11, 2018

(65) Prior Publication Data
US 2019/0342083 A1 Nov. 7, 2019

(51) Int. Cl.
*H04L 9/08* (2006.01)
*G06F 21/62* (2013.01)
(Continued)

(52) U.S. Cl.
CPC ............ *H04L 9/0822* (2013.01); *G06F 21/62* (2013.01); *H04L 9/085* (2013.01); *H04L 9/14* (2013.01); *H04L 63/0435* (2013.01)

(58) Field of Classification Search
CPC ............ G06F 21/62–629; H04L 9/0822; H04L 9/0825; H04L 9/083–0836; H04L 9/085;
(Continued)

(56) References Cited

U.S. PATENT DOCUMENTS

2008/0310636 A1  12/2008  Bennett
2011/0176675 A1  7/2011  Hughes et al.
(Continued)

FOREIGN PATENT DOCUMENTS

EP  1524580 A2  4/2005

OTHER PUBLICATIONS

International Search Report and Written Opinion, dated Jul. 18, 2017, in PCT Application No. PCT/US2016/060656, 11 pages.
(Continued)

*Primary Examiner* — Kevin Bechtel
(74) *Attorney, Agent, or Firm* — Kilpatrick Townsend & Stockton LLP

(57) ABSTRACT

Systems and methods for enabling data encryption control are described. A requesting entity may request to decrypt an encrypted message. The authorization for the requesting entity to decrypt the encrypted message may be performed by a plurality of controlling authorities. The decryption key for decrypting the encrypted message may be split and encrypted specifically for the plurality of controlling authorities, so that no single controlling authority has enough information to decrypt the encrypted message. A designated number of the controlling authorities may be requested to decrypt an encrypted key part in order for the requesting entity to be authorized to reconstruct the decryption key.

20 Claims, 13 Drawing Sheets

(51) Int. Cl.
*H04L 9/14* (2006.01)
*H04L 29/06* (2006.01)

(58) Field of Classification Search
CPC ...... H04L 9/0894–0897; H04L 63/0435–0457
See application file for complete search history.

(56) References Cited

U.S. PATENT DOCUMENTS

| | | |
|---|---|---|
| 2014/0233740 A1 | 8/2014 | Niamut et al. |
| 2015/0149787 A1 | 5/2015 | Panchapakesan et al. |
| 2016/0241390 A1 | 8/2016 | Harris et al. |
| 2017/0222805 A1* | 8/2017 | Telford ................. H04L 9/0822 |
| 2017/0324549 A1* | 11/2017 | Abramovsky ...... H04L 63/0428 |

OTHER PUBLICATIONS

Extended European Search Report dated Oct. 16, 2019 for EP Application No. 16920782.6, 5 pages.

* cited by examiner

DATA ENCRYPTION CONTROL USING MULTIPLE CONTROLLING AUTHORITIES

CROSS-REFERENCES TO RELATED APPLICATIONS

This application is the U.S. National Phase of PCT Application No. PCT/US2016/060656, filed Nov. 4, 2016, the disclosure of which is incorporated by reference.

BACKGROUND

Typically, an encrypting entity may encrypt information for security such that only the recipient can decrypt the information. Nonetheless, there are situations in which the encrypting entity may want to leave open the possibility to provide other entities the ability to decrypt the information. However, at present, there is no feasible way to securely encrypt information and then enable entities other than the recipient to decrypt the information without use of a back door or key escrow, which may enable the entity to access more information beyond the original intent (e.g., more than a single message).

Embodiments of the invention address this and other problems, individually and collectively.

BRIEF SUMMARY

Systems and methods for enabling data encryption control are described. As an example, a requesting entity may request to decrypt an encrypted message. The authorization for the requesting entity to decrypt the encrypted message may be performed by a plurality of controlling authorities. The decryption key needed to decrypt the encrypted message may be split and encrypted specifically for the plurality of controlling authorities, so that no single controlling authority has enough information to decrypt the encrypted message. A designated number of the controlling authorities may have to decrypt an encrypted key part in order for the requesting entity to be authorized to reconstruct the decryption key.

Some embodiments can be performed by a computer associated with an encrypting entity. The computer may generate a key for a message and may also generate N key parts of the one-time encryption key. N may be an integer of at least two. At least M of the key parts may be combinable to generate the one-time encryption key so that the generated one-time encryption key can be operable to decrypt the second portion of the message. M may be an integer equal to or less than N. In some embodiments, the key may be a symmetric key, which may be generated using a private key of the encrypting entity and a public key associated with the target device.

For each of the key parts, the computer may encrypt the key part using a trusted key of a corresponding controlling authority. In some implementations, encrypting the key part may comprise generating a symmetric key and then encrypting the key part using the generated symmetric key. The symmetric key may be generated using the public key of the corresponding controlling authority and a private key of the encrypting entity.

The computer can generate the message, which may include at least a first portion and a second portion. The first portion may include the plurality of encrypted key parts and identifiers of the plurality of controlling authorities. The second portion may be encrypted using the one-time encryption key. In some implementations, each of the identifiers of the plurality of controlling authorities includes a URL routed to the corresponding controlling authority. In some embodiments, the message can include policy information. The policy information may comprise information indicating entities authorized or not authorized to decrypt encrypted key parts and information indicating credential types, claims, and validation methods that are acceptable for authentication or authorization of the entities.

The computer may then send the message. In some cases, the computer may send the message to a target device. In some embodiments, the target device may be a claimant device associated with a claimant that requests to decrypt the message. In some cases, the message may be further sent to computers associated with the plurality of controlling authorities.

Some embodiments can be performed by a target device. The target device can receive a message including at least a first portion and a second portion. The first portion can include at least M encrypted key parts of a key generated for the message and identifiers of a plurality of controlling authorities. In some embodiments, each of the identifiers of the plurality of controlling authorities includes a URL routed to the corresponding controlling authority. Each encrypted key part may be encrypted using a trusted key of a corresponding controlling authority. A computer associated with an encrypting entity may generate N key parts of the key, where N can be an integer of at least two and M can be an integer equal to or less than N. The second portion may be encrypted using the key.

The target device may route the message to one or more computers with a request to decrypt the message. In some cases, routing the message may comprise sending the message to a plurality of computers associated with the plurality of controlling authorities based on the identifiers. In other cases, routing the message may comprise sending the message to a computer associated with a controlling authority from the plurality of controlling authorities with a request to send the message to a plurality of computers associated with the plurality of controlling authorities. In yet some other cases, routing the message may comprise sending the message to an intermediary computer with a request to send the message to a plurality of computers associated with the plurality of controlling authorities. In the cases in which the message is sent to the intermediary computer, the message may include a URL routed to the intermediary computer.

The target device may receive a plurality of re-encrypted key parts encrypted specifically for the target device. Each re-encrypted key part may be encrypted by a corresponding controlling authority from the plurality of controlling authorities. In some cases, the plurality of re-encrypted key parts may be received from one or more of the plurality of computers associated with the plurality of controlling authorities or the intermediary computer.

The target device may decrypt at least M of the plurality of re-encrypted key parts to obtain at least M key parts. In some embodiments, decrypting the at least M of the plurality of re-encrypted key parts comprises performing a process for each of the at least M of the plurality of re-encrypted key parts. The process can include generating a symmetric key using a private key associated with the target device and a public key of the corresponding controlling authority. The process can also include decrypting the re-encrypted key part using the symmetric key.

The target device may then decrypt the message based on the decrypted key parts. The target device can generate the key by combining the at least M key parts. Using the generated key, the target device may then decrypt the second portion of the message.

Some embodiments can be performed by a computer associated with a controlling authority. The computer can receive a message including at least a first portion and a second portion. The first portion may include at least M encrypted key parts of a key generated for the message and identifiers of a plurality of controlling authorities. Each encrypted key part may be encrypted using a trusted key of a corresponding controlling authority. A computer associated with an encrypting entity may generates N key parts of the key, where N can be an integer of at least two and M can be an integer equal to or less than N. The second portion may be encrypted using the key. At least M of the key parts of the key may be combinable to generate the key such that the generated key is operable to decrypt the second portion of the message. The message may be received from the target device, an intermediary computer, or another computer associated with another controlling authority. In some embodiments, the target device may be a claimant device associated with a claimant that can request to decrypt the message.

The computer associated with the controlling authority may then decrypt the decrypt an encrypted key part in the message to obtain a key part. In some embodiments, decrypting the key part may comprise obtaining a private key of the controlling authority and decrypting the encrypted key part using the private key. In some implementations, decrypting the key part may comprise generating a symmetric key using a public key of the encrypting entity and a private key of the controlling authority and decrypting the encrypted key part using the symmetric key.

The computer associated with the controlling authority may re-encrypt the key part to generate a re-encrypted key part encrypted specifically for a target device. In some embodiments, re-encrypting the key part may comprise generating a symmetric key using a private key of the controlling authority and a public key associated with the target device and re-encrypting the key using the symmetric key.

The computer associated with the controlling authority may send the re-encrypted key part. The re-encrypted key part may be sent to the target device, an intermediary computer, or another computer associated with another controlling authority.

In some embodiments, the computer associated with the controlling authority may conduct further steps. For example, the computer may send the message to the plurality of computers associated with the plurality of controlling authorities. The computer may further receive at least M−1 re-encrypted key parts encrypted specifically for the target device from the plurality of computers associated with the plurality of controlling authorities. The computer may further send the re-encrypted key part and the received at least M−1 re-encrypted key parts to the target device.

Embodiments of the invention are further directed to a computer comprising a processor and a computer-readable medium coupled to the processor. The computer-readable medium may comprise instructions, that when executed by the processor, perform methods described herein.

Embodiments of the invention are further directed to a computer product. The computer product may comprise a computer readable medium that can store a plurality of instructions for controlling a computer system to perform an operation of any of the methods described herein.

Embodiments of the invention are further directed to a system. In some embodiments, the system may comprise the computer product described above, as well as one or more processors for executing instructions stored on the computer readable medium.

Embodiments of the invention are further directed to a system that may comprise means for performing any of the methods described herein.

Embodiments of the invention are further directed to a system that can be configured to perform any of the methods described herein.

Embodiments of the invention are further directed to a system that may comprise modules that can respectively perform the steps of any of the methods described herein.

These and other embodiments of the invention are described in further detail below.

DETAILED DESCRIPTION

Figure 1:
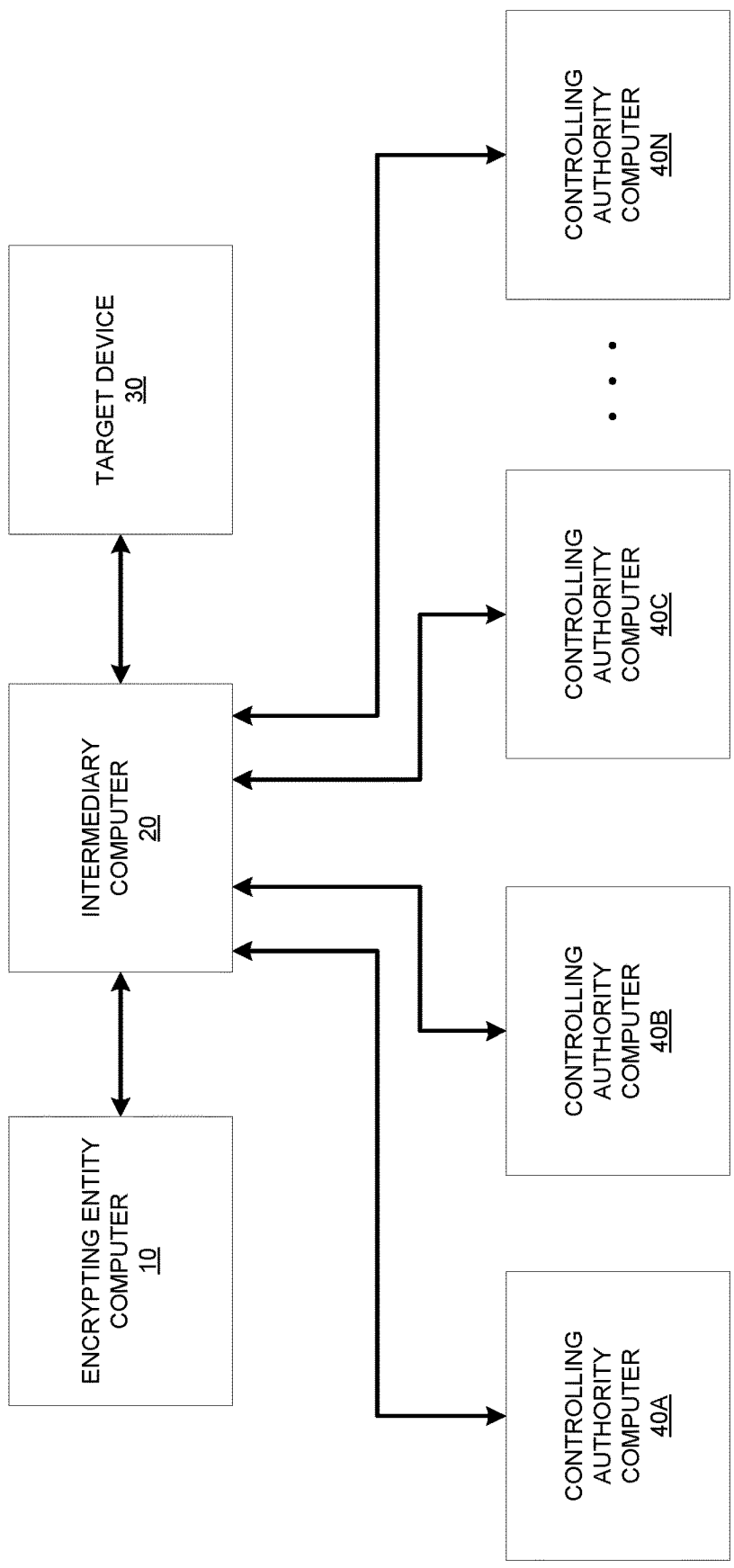
FIG. 1 shows an exemplary system according to embodiments of the invention.

Data encryption can be utilized to protect data from third party entities. For example, data that is sent from a sender to a recipient is encrypted to protect it from malicious intermediary parties that may attempt to intercept the data. However, since the intermediary parties do not have the information needed to decrypt the encrypted data, such as decryption keys, they cannot perform a decryption process.

Only the authorized recipient can access the necessary information to decrypt the encrypted data and thus access the data.

However, there are situations in which an authorized third party may need to recover some encrypted data, which can be problematic when very strong encryption is used. Example systems and methods for protecting data using strong encryption techniques are described in U.S. Non-Provisional application Ser. No. 14/595,792 filed Jan. 13, 2015, U.S. Non-Provisional application Ser. No. 14/743,874 filed Jun. 18, 2015, U.S. Non-Provisional application Ser. No. 15/008,388 filed Jan. 27, 2016, and U.S. Non-Provisional application Ser. No. 15/045,052 filed Feb. 16, 2016, which are hereby incorporated by reference in their entirety for all purposes. Aspects these applications can be combined, mixed, and matched, as one of ordinary skill would recognize with some embodiments of the invention.

As described above, the third party is not able to receive the encrypted data under such circumstances because it does not have access to information needed to decrypt the encrypted data. Yet, simply providing the information needed for decryption to the authorized third party is not secure because this can provide it with too much power. For example, this may enable the authorized third party to utilize the received information to decrypt data beyond its original intent (e.g., more than a single message), which can compromise confidential information. There is a need for secure systems and methods that enable recovery of encrypted data by a third party.

Another issue is that even if there were a way to enable a third party to recover encrypted data, the decision to purposefully enable the third party to recover the encrypted data is controversial. It is likely that such a decision will be met with opposition due to various reasons, including privacy concerns. For example, an entity sending an encrypted message to a recipient does so with the intention that data in the message will only be seen by the recipient. Enabling the data to be exposed to a third party may violate the right to privacy of the sending entity and the recipient entity. However, under extreme circumstances, it can be beneficial to recover encrypted data. For example, recovering encrypted data may provide valuable information in situations pertaining to matters of national security.

While it may be useful to keep open the possibility that encrypted data can be recovered by third parties in select situations, it can be dangerous for the ability to recover encrypted data to be made too readily available. Thus, there is a need for a system with checks and balances that ensures that a decision for allowing a third party to recover encrypted data cannot be made easily. For example, the system may ensure that the power to decide whether to allow recovery of encrypted data can be mitigated amongst multiple entities, so that no single entity will be able to make the decision on its own.

One way to ensure that the power to decide to enable recovery of encrypted data is decentralized is to provide multiple controlling authorities with a different portion of the information needed to decrypt the encrypted data. This prevents any single entity from being able to perform the decryption process, as well as being able to provide another entity with enough information to perform the decryption process. In one embodiment, a decryption key may be needed to decrypt encrypted data. The decryption key may be split into multiple key parts, which can be distributed to multiple entities. No single entity may receive enough information to generate the decryption key and thus decrypt the encrypted data. Hence, is it possible to recover the encrypted data only upon cooperation of multiple entities that received key parts. This ensures that multiple entities have to agree in order to provide a requesting party with the ability to recover encrypted data, which prevents a single entity from becoming too powerful.

I. System

An exemplary system including an encrypting entity computer and a target device for enabling data encryption control is described.

Example Architecture

FIG. 1 shows an exemplary system 100 according to embodiments of the invention. FIG. 1 includes an encrypting entity computer 10 and a target device 30, where target device 30 may send a request to an intermediary computer 20 to decrypt data encrypted by encrypting entity computer 10. Intermediary computer 20 may communicate with a plurality of controlling authority computers, including controlling authority computer 40A, controlling authority computer 40B, controlling authority computer 40C, and controlling authority computer 40N, in order to retrieve information to be used for decryption by target device 30. It is understood that intermediary computer 20 may be in communication with any suitable number of controlling authority computers and that the depiction of controlling authority computers 40A through 40N in FIG. 1 is not meant to be restrictive.

Each of the entities shown in FIG. 1 (e.g., encrypting entity computer 10, intermediary computer 20, target device 30, controlling authority computers 40A-40N) may also be known as a computing device. A computing device can include a processor, memory, input devices, and output devices, operatively coupled to the processor. The computing device may comprise a computer-readable medium coupled to the processor. The computer-readable medium may comprise instructions, that when executed by the processor, can perform methods described herein. A computing device may be capable of communicating with other device, computers, or systems over a suitable communications network.

Exemplary computing devices include cellular or mobile phones, tablet computers, desktop computers personal digital assistants (PDAs), pagers, portable computers, server computers, and the like. Additional computing devices may include wearable devices, such as smart watches, glasses fitness bands, ankle bracelets, rings, earrings, etc. In some embodiments, the computing device may include automobiles with remote communication capabilities.

Encrypting entity computer 10 may be a computing device that can encrypt data. Encrypting entity computer 10 may be capable of generating encryption keys and encrypting data using the generated encryption keys. In some embodiments, the encryption keys may comprise symmetric keys generated using the Diffie-Hellman key exchange protocol. In some cases, the generated encryption keys may be ephemeral keys. Encrypting entity computer 10 may also be capable of retrieving encryption keys from other entities and encrypting data using the retrieved encryption keys.

Encrypting entity computer 10 may split an encryption key into a plurality of key parts. Any suitable key splitting algorithm may be utilized. In some embodiments, encrypting entity computer 10 may utilize a threshold scheme (e.g., Shamir's Secret Sharing scheme, Blakley's scheme, Mignotte's scheme, Asmuth-Bloom's scheme, etc.), so that any M key parts of the total N key parts are sufficient to reconstruct the original encryption key, where M is an integer equal to or less than N. The encryption key may be a symmetric key that can be used to encrypt and decrypt data.

Encrypting entity computer 10 may generate messages as well as communicate messages to and from other computing devices. In some embodiments, encrypting entity computer 10 may be associated with a sending entity (e.g., sender) and may transmit messages comprising data encrypted by encrypting entity computer 10 to another computing device. For example, encrypting entity computer 10 may generate a message comprising data encrypted using an encryption key. The message may further comprise key parts of the encryption key, where the key parts may be generated by the encrypting entity computer 10 as described above. In some embodiments, encrypting entity computer 10 may encrypt the key parts before including them in the message.

Intermediary computer 20 may be a computing device that relays information between computing devices. Intermediary computer 20 may be associated with a broker and may communicate information to and from a plurality of controlling authority computers. In some embodiments, intermediary computer 20 may receive a request from target device 30 to decrypt data encrypted by encrypting entity computer 10 using an encryption key. Subsequently, intermediary computer 20 may send each of the plurality of controlling authority computers a message comprising encrypted key parts of the encryption key. After the plurality of controlling authority computers decrypt a sufficient number of encrypted key parts, intermediary computer 20 may receive the decrypted key parts. Intermediary computer 20 may send the decrypted key parts to target device 30, which may combine them to generate the encryption key that can be used to decrypt the encrypted data. In some embodiments, intermediary computer 20 may host a web site or web service through which target device 30 can request key parts for decrypting a message. Intermediary computer 20 may be part of any suitable communications network.

In some embodiments, use of intermediary computer 20 is not required. Some actions described above as being performed by intermediary computer 20 may be performed by other entities, such as encrypting entity computer or target device 30. For example, the plurality of controlling authority computers (e.g., controlling authority computers 40A-40N) may communicate with encrypting entity computer 10 to receive encrypted key parts. Subsequently, the plurality of controlling authority computers may send the decrypted key parts to encrypting entity computer 10, which may send them to target device 30.

Target device 30 may be a computing device that is associated with an entity that requests to decrypt encrypted data. The entity may be an individual or a larger organization and in some cases, may also be known as a claimant. In some embodiments, the claimant may be a controlling authority, described in more detail below. Target device 30 may send the request to decrypt to intermediary computer 20, which may then communicate with a plurality of controlling authority computers to determine whether the decryption request can be fulfilled. Target device 30 may be able to receive key parts from intermediary computer 20 and combine them to generate a key. Target device 30 may then use the generated key to decrypt the encrypted data.

Controlling authority computer 40A may be a computing device associated with a controlling authority. In some embodiments, the controlling authority may be an entity that is enabled (e.g., legally) to provide encryption control services. For example, controlling authority computer 40A may be associated with a corporation, a government agency, a law enforcement agency, a security agency, an authentication service provider, a processing network, or other entity. In some embodiments, the controlling authority may perform a registration process with intermediary computer 20. In some cases, the controlling authority may also be known as an encryption control service or trusted authority. However, it is noted that embodiments of the invention are not limited to cases in which the controlling authorities can be trusted. For example, embodiments of the invention can still be implemented when it is not known whether the controlling authorities can be trusted.

Controlling authority computer 40A may be in communication with intermediary computer 20. In response to receiving a request to decrypt data encrypted by encrypting entity computer 10 from target device 30, intermediary computer 20 may send controlling authority computer 40A a message including a key part encrypted specifically for controlling authority computer 40A. For example, the key part may be encrypted using a public key associated with controlling authority computer 40A, so that only controlling authority computer 40A that possesses its corresponding private key can decrypt the encrypted key part. Controlling authority computer 40A may send the decrypted key part back to intermediary computer 20. It is noted that controlling authority computer 40A does not have enough information to decrypt data encrypted by encrypting entity computer 10. Controlling authority computer 40A merely provides a portion of the information, a key part, that is utilized for the decryption process.

While a detailed description of controlling authority computer 40A is included above, it is understood that a similar description applies to other controlling authority computers, such as controlling authority computer 40B and controlling authority computers 40C through 40N.

Each of the controlling authorities associated with the controlling authority computers contacted by intermediary computer 20 may decide independently whether or not to return a key part to intermediary computer 20. Reasons for deciding against providing a key part to intermediary computer 20 may include ethical, social, or legal reasons. For example, a controlling authority may believe that a particular claimant requesting decryption of encrypted data should not be allowed to see the encrypted data because it would violate privacy rights of the original sender and recipient of the encrypted data. In this case, the controlling authority may decide not send a key part to intermediary computer 20, which decreases the chances that a sufficient number of key parts can be aggregated to enable successful decryption of the encrypted data. In some implementations, if at least M of the N controlling authority computers do not return a key part to intermediary computer 20, the encrypted data cannot be successfully decrypted.

II. Multi-Party Control of Encrypted Data

A method for performing data encryption control according to embodiments of the invention is described below. Data encryption control may enable a third party to request to decrypt encrypted data originally intended for another entity. Additionally, the ability of the third party to decrypt the encrypted data may rely on consent by multiple controlling authorities.

A. Method

Figure 2:
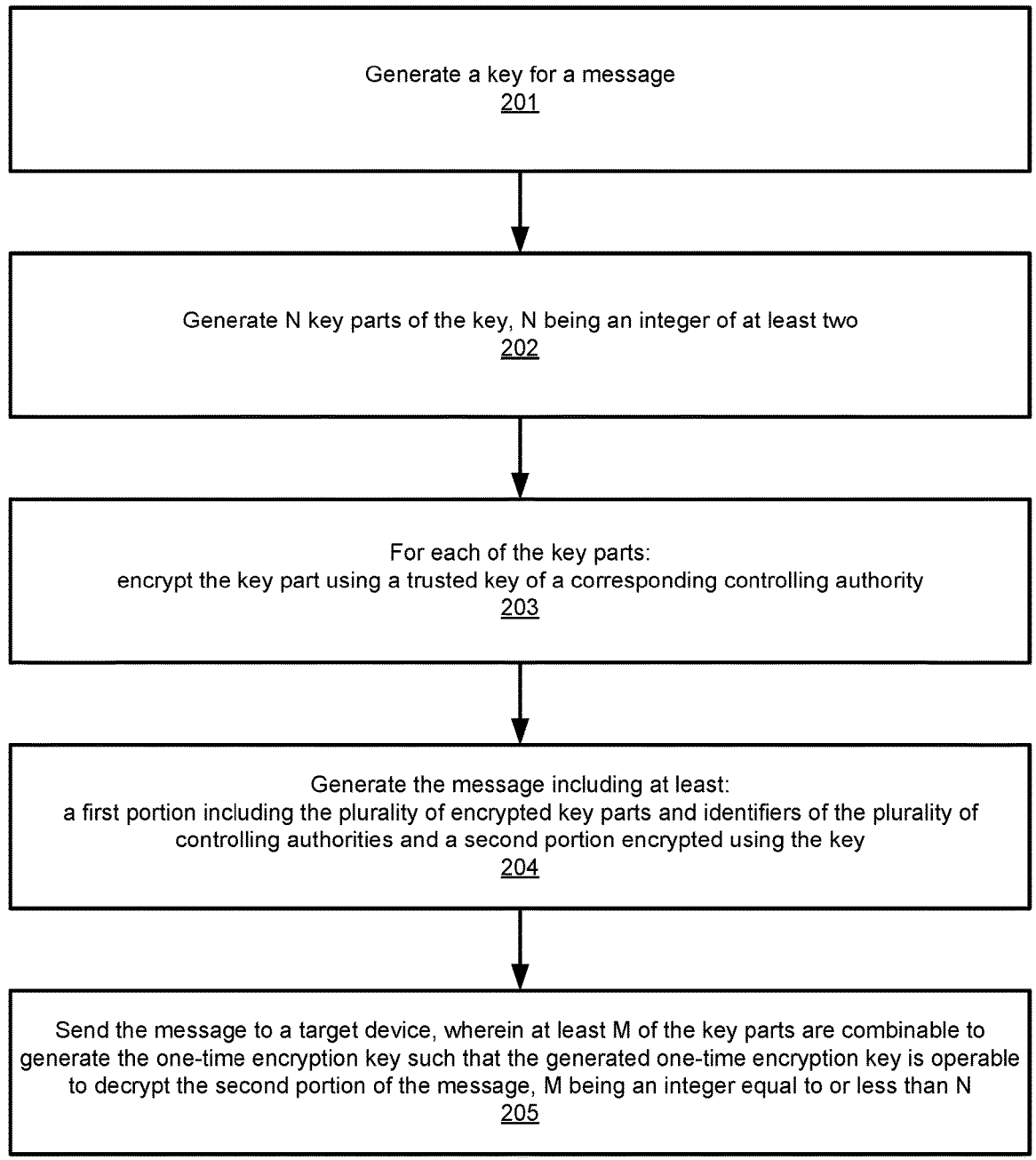
FIG. 2 shows an exemplary flow diagram according to embodiments of the invention.

FIG. 2 shows an exemplary flow diagram 200 of a data encryption control process performed by an encrypting entity computer according to embodiments of the invention. In some embodiments, the encrypting entity computer may have similar properties to those of encrypting entity computer 10 of FIG. 1. While flow diagram 200 describes a process for controlling encrypted data for one message, the process may be repeated for multiple messages that are requested to be decrypted by third parties. Further details regarding the steps included in flow diagram 200 are described with respect to at least FIG. 5.

At step 201, the encrypting entity computer may generate a key for a message. In some embodiments, the key may be a symmetric key so that it can be used to encrypt and decrypt data. In some implementations, the key may be generated using Elliptic-Curve Diffie-Hellman (ECDH). In some embodiments, the key may be a one-time encryption key generated specifically for the message. The use of the one-time encryption key is beneficial because an entity that retrieves the one-time encryption key cannot use it to access more information beyond the original intent (e.g., more than a single message).

At step 202, the encrypting entity computer may generate N key parts of the one-time encryption key, where N is an integer of at least two. The encrypting entity computer may split the one-time encryption key into N key parts, where each key part is unique. In some implementations, all of the key parts may be needed in order to reconstruct the one-time encryption key. In other implementations, the encrypting entity computer may utilize a threshold scheme in which a designated number of the key parts less than N is sufficient to reconstruct the one-time encryption key.

At step 203, for each of the key parts, the encrypting entity computer may encrypt the key part using a trusted key of a corresponding controlling authority. In some embodiments, the trusted key may be derived from a form of key agreement. For example, in some cases, the trusted key may be derived based on a public key infrastructure (PKI). In other cases, the trust cases, the trusted key may be derived based on the Diffie-Hellman key exchange or other suitable key exchange protocol. In other cases, the trusted key may be a master symmetric key derived based on various information (e.g., timestamp, a counter, identifiers, nonces, etc.).

In some embodiments, the encrypting entity computer may encrypt each key part specifically for a different controlling authority, so that each controlling authority can only decrypt a single unique encrypted key part. For example, for the key part encrypted using the public key associated with a controlling authority, the controlling authority may decrypt the encrypted key part using their corresponding private key. Since no other entity besides the controlling authority possesses this private key, the encrypted key part can only be decrypted by the controlling authority. Similarly, the controlling authority cannot decrypt key parts encrypted specifically for other controlling authorities.

The key parts may be encrypted for a plurality of controlling authorities. The controlling authorities may have been previously selected to participate in the data encryption control process by the encrypting entity computer or other entity. Each controlling authority may be registered to participate as described with respect to FIG. 3. Each controlling authority may be associated with a key pair including a public key and a private key, where the public key may be publicly accessible and the private key may only be known to the corresponding controlling authority.

At step 204, the encrypting entity computer may generate the message including at least a first portion and a second portion. The first portion may comprise a header for the message and the second portion may comprise a payload for the message. The first portion may include the plurality of the encrypted key parts and identifiers of the plurality of controlling authorities. In some embodiments, the identifiers of the plurality of controlling authorities may be hashes of the public keys associated with the plurality of controlling authorities. The second portion may be encrypted using the one-time encryption key generated in step 201.

At step 205, the encrypting entity computer may send the message to a target device. The target device may be associated with a third party by which the encrypted portion of the message was not originally meant to be received. In some cases, the target device may be associated with the requesting entity that requests decryption of the message. In other cases, the target device may be associated with another entity that is authorized to request decryption of the message on behalf of the requesting entity.

In some implementations, the key parts generated in step 202 may be configured so that at least M of the N generated key parts may be combinable to generate the one-time encryption key. M may be an integer equal to or less than N. The generated one-time encryption key may be operable to decrypt the second portion of the message.

Upon receiving the message, the target device cannot decrypt the second portion of the message because it does not have enough information to generate the one-time encryption key. This is because the key parts that are combinable to generate the one-time encryption key are encrypted specifically for a plurality of controlling authorities and thus cannot be decrypted by the target device. Accordingly, the target device may send an authorization request to an intermediary (e.g., broker) that may then communicate with controlling authority computers associated with the plurality of controlling authorities on behalf of the target device. If at least M of the N controlling authorities return a key part, the intermediary may forward the returned key parts to the target device. The target device may combine the at least M key parts to generate the one-time encryption key that can be utilized to decryption the second portion of the message.

B. Registration of Controlling Authority Certificates for Multi-Party Control

Figure 3:
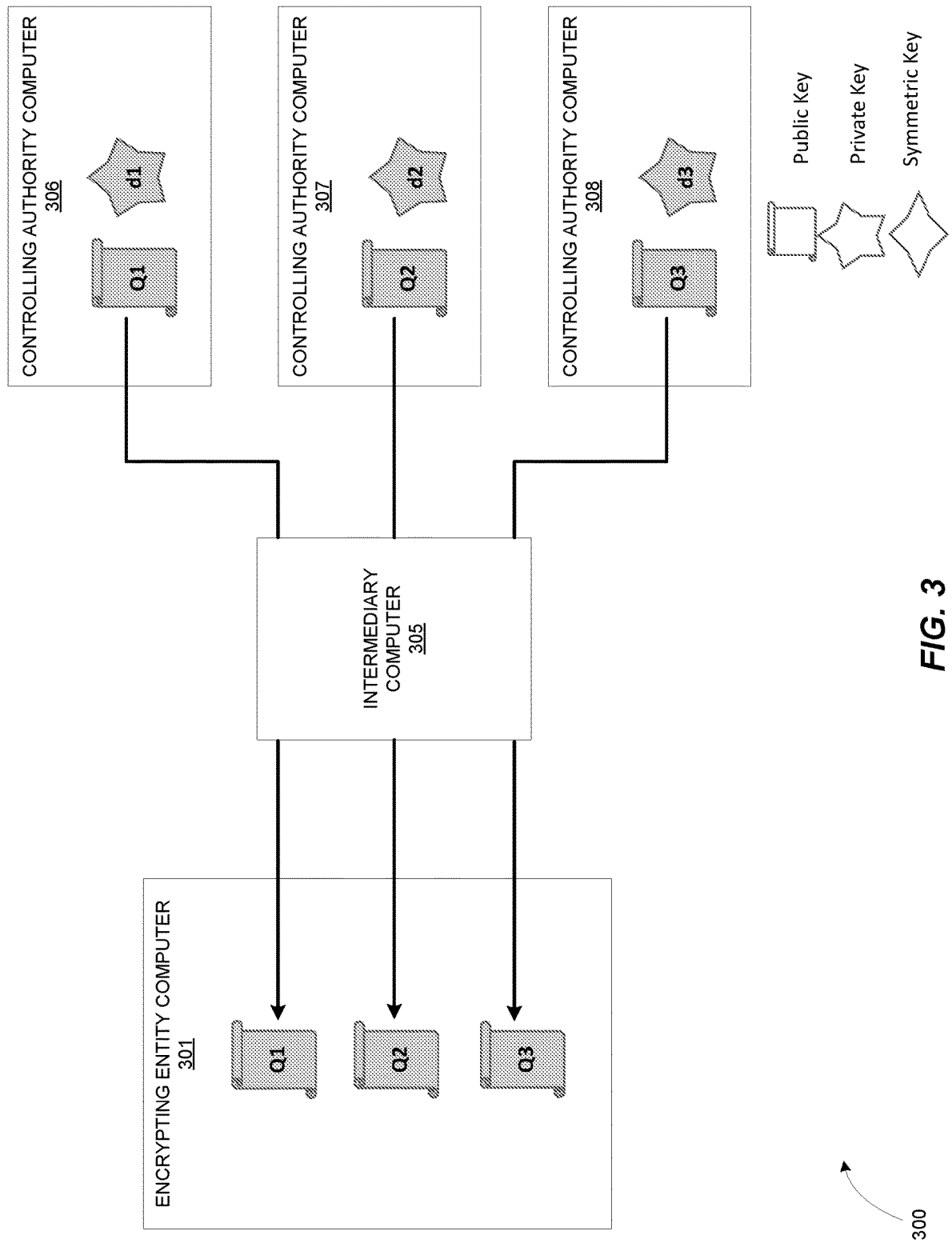
FIG. 3 shows an exemplary registration process flow for controlling authorities according to embodiments of the invention.

FIG. 3 shows an exemplary registration process flow 300 for controlling authorities according to embodiments of the invention. Registration process flow 300 enables multi-party control of encrypted data. FIG. 3 includes an encrypting entity computer 301 in communication with an intermediary computer 305. FIG. 3 also includes controlling authority computer 306, controlling authority computer 307, and controlling authority computer 308, which may be in communication with intermediary computer 305. Some components of FIG. 3 may have similar properties to those of FIG. 1, such as encrypting entity computer 301 to encrypting entity computer 10, intermediary computer 305 to intermediary computer 20, and controlling authority computer 307, 308, 309 to controlling authority computers 40A to 40N.

While an exemplary case in which three controlling authority computers conduct a registration process is described with respect to FIG. 3, it is understood that any number of controlling authority computers may perform a similar registration process. The controlling authorities that can perform registration processes may be designated to participate in multi-party control of encrypted data. In some cases, the controlling authorities may be selected by the encrypting entity. In other cases, the controlling authorities may be selected by another entity or authorized based on a statute.

Each controlling authority computer may be operated by a controlling authority, which may be associated with a key pair including a public key and private key. For example, controlling authority computer 306 may be operated by a first controlling authority and may be associated with a public key Q1 and a private key d1. Controlling authority computer 307 may be operated by a second controlling authority and may be associated with a public key Q2 and a private key d2. Controlling authority computer 308 may be operated by a third controlling authority and may be associated with a public key Q3 and a private key d3.

Encrypting entity computer 301 may obtain public keys of the controlling authorities through intermediary computer 305. In some embodiments, intermediary computer 305 may provide a website or online application that controlling authority computers 307, 308, and 309 may utilize to conduct the registration process. During registration, controlling authority computers 307, 308, and 309 may provide a public key certificate including their public key. In some cases, intermediary computer 305 may verify the public key certificate based on a digital signature included in the public key certificate.

Intermediary computer 305 may then forward the received public keys to encrypting entity computer 301. For example, controlling authority computer 307 may provide their public key Q1, controlling authority computer 308 may provide their public key Q2, and controlling authority computer 309 may provide their public key Q3 to intermediary computer 305. Intermediary computer 305 may then forward public keys Q1, Q2, and Q3 to encrypting entity computer 301, which may store the received public keys. The public keys can be used to identify the controlling authorities that may participate in multi-party control of encrypted data.

III. Data Encryption Control with Access to Target Certificate

In some embodiments, the encrypting entity may have access to a certificate including the public key associated with an entity requesting authorization to decrypt encrypted data. The entity may be known as a target and associated with a target device. The encrypting entity may use the public key to enable data encryption control of the encrypted data.

A. Obtaining Target Certificate

Figure 4:
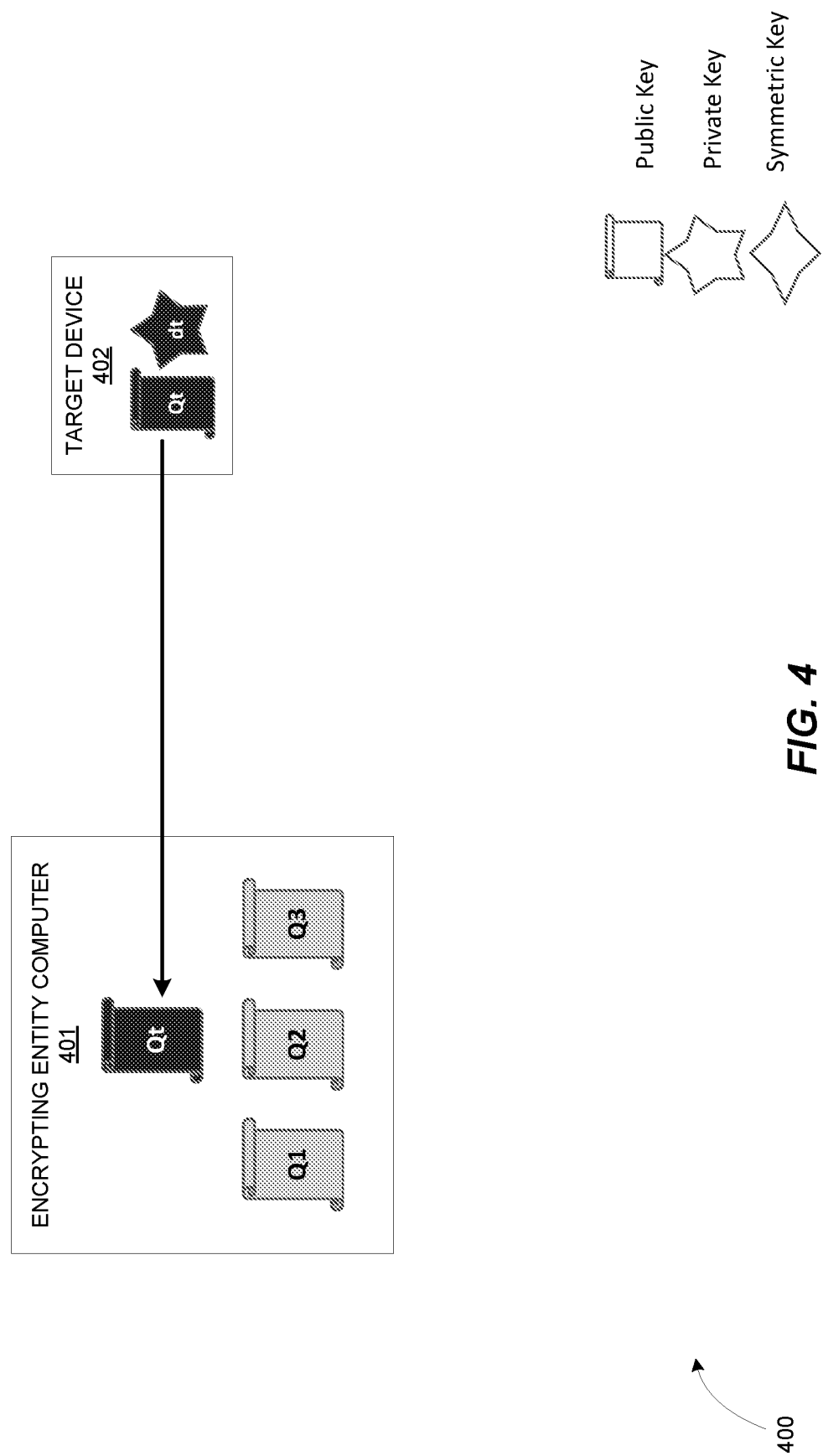
FIG. 4 shows an exemplary process flow for obtaining a target certificate according to embodiments of the invention.

FIG. 4 shows an exemplary process flow 400 for obtaining a target certificate according to embodiments of the invention. FIG. 4 includes an encrypting entity computer 401 in communication with a target device 402 associated with an entity requesting authorization to decrypt encrypted data. In some embodiments, encrypting entity computer 301 may have similar properties to those of encrypting entity computer 10 in FIG. 1 and target device 402 may have similar properties to those of target device 30 of FIG. 1. Encrypting entity computer 401 may store public keys Q1, Q2, and Q3 corresponding to registered controlling authorities, as described with respect to FIG. 3. Target device 402 may be associated with a key pair including a public key Qt and a private key dt.

Encrypting entity computer 401 may obtain a public key certificate associated with target device 402. The public key certificate may include the public key Qt associated with target device 402. The public key certificate may be publicly available or may be retrieved from a certificate authority. In some cases, encrypting entity computer 401 may verify the public key certificate based on a digital signature included in the public key certificate.

B. Message Generation by Encrypting Entity

Figure 5:
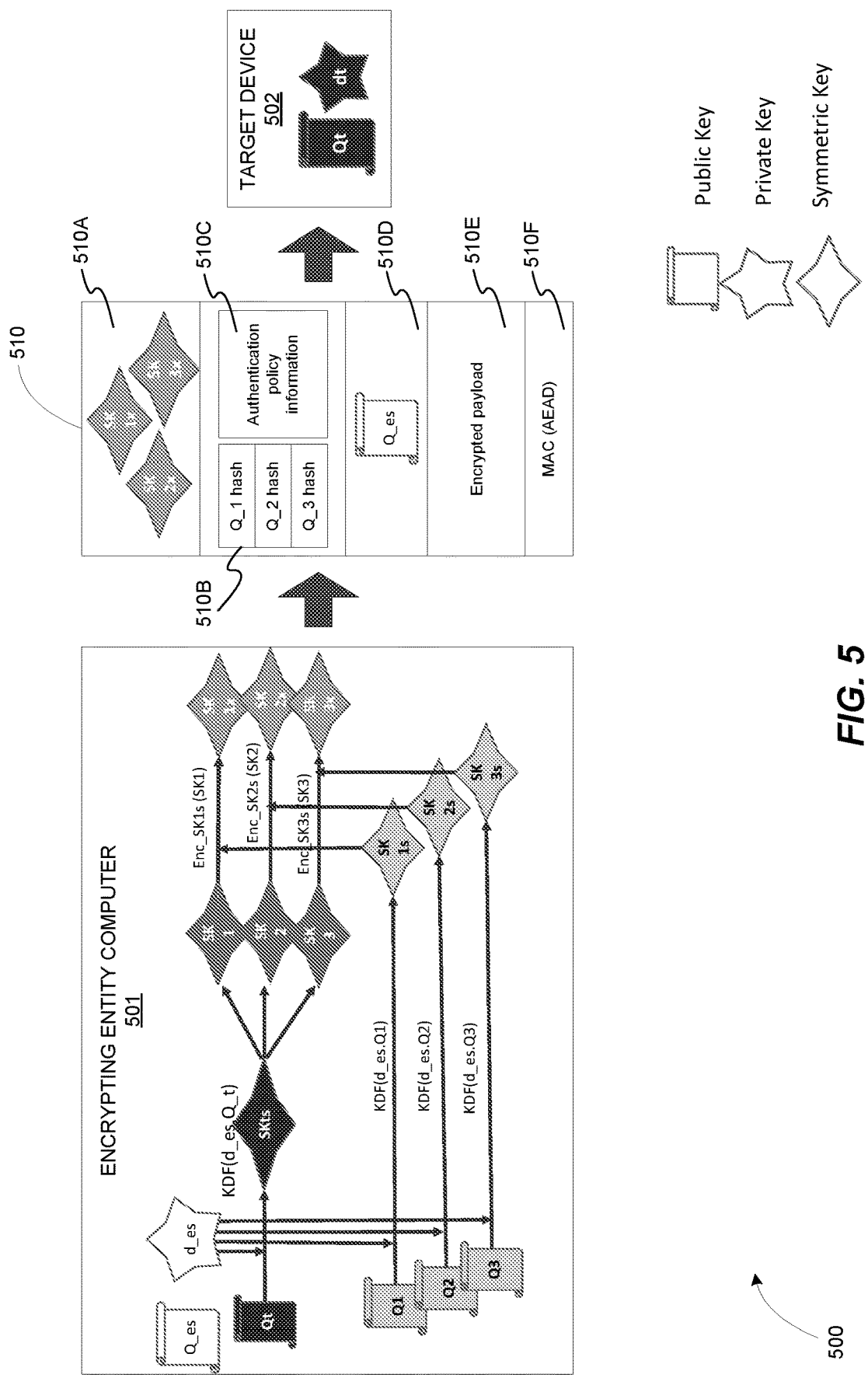
FIG. 5 shows an exemplary process flow for generating an encrypted message according to embodiments of the invention.

FIG. 5 shows an exemplary process flow 500 for generating an encrypted message according to embodiments of the invention. FIG. 5 includes encrypting entity computer 501 and target device 502. Encrypting entity computer 501 may encrypt the message and may be associated with the entity that sends the encrypted message. Target device 502 may be associated with the entity requesting to decrypt the encrypted message. Target device 502 may be associated with public key Qt and private key dt, where encrypting entity computer 501 has obtained public key Qt using a method similar to that described with respect to FIG. 4.

FIG. 5 also includes an exemplary message 510 generated by encrypting entity computer 501. Message 510 includes metadata as well as encrypted data and enables multi-party data encryption control. The metadata may be stored in a header of message 510. Message 510 includes encrypted key parts 510A, controlling authority identifiers 510B, an authentication policy information 510C, a public key certificate 510D, an encrypted payload 510E, and a message authentication code (MAC) 510F.

Encrypted payload 510E may comprise encrypted data associated with message 510. In some embodiments, encrypted payload 510E may be encrypted using an encryption key generated by encrypting entity computer 501. For example, the encryption key may be a symmetric key, such as that shown as SKts in FIG. 5. An entity that possesses symmetric key SKts may be able to decrypt encrypted payload 510E.

An exemplary method for deriving symmetric key SKts is described. Encrypting entity computer 501 may generate a one-time public key Q_es and one-time private key d_es, so that the one-time public key Q_es and one-time private key d_es can be used specifically for message 510. Any suitable key-generation method may be utilized. In some embodiments, the one-time public key Q_es and one-time private key d_es may be generated based on another key pair associated with encrypting entity computer 501. In some implementations, encrypting entity computer 501 may generate SKts using the public key Qt of target device 502 and the one-time private key d_es. For example, encrypting entity computer 501 may use Elliptic curve Diffie-Hellman (ECDH) and a key derivation function (KDF) to establish symmetric key SKts. The KDF may be used to convert the result of ECDH of the public key Qt of target device 502 and the one-time private key d_es into symmetric key SKts, so that it is compatible for use with the Advanced Encryption Standard (AES).

Encrypted key parts 510A may be key parts of symmetric key SKts that are encrypted by encrypting entity computer 501. Encrypted key parts 510A may be included as part of the metadata in the header of message 510. In some cases, encrypted key parts 510A may be encrypted symmetric keys, such as those shown as SK1x, SK2x, and SK3x in FIG. 5. Each encrypted key part of encrypted key parts 510A may be encrypted specifically for a controlling authority that may be participating in multi-party data encryption control of message 510. This ensures that no single entity, including target device 502 and any of the controlling authorities, can decrypt all encrypted key parts 510A in order to generate symmetric key SKts.

An exemplary method for deriving encrypted key parts SK1x, SK2x, and SK3x is described. First, encrypting entity computer 501 may split symmetric key SKts into a plurality of key parts. In this exemplary case, encrypting entity computer 501 may split symmetric key SKts into three key parts, SK1, SK2, and SK3. Any suitable method for key splitting may be used. In some embodiments, symmetric key SKts may be split so that SK1, SK2, and SK3 are combinable to reconstruct symmetric key SKts. In other embodiments, symmetric key SKts may be split using a threshold scheme such that any of at least two key parts of SK1, SK2, and SK3 are combinable to reconstruct symmetric key SKts.

Encrypting entity computer 501 may encrypt each of key parts SK1, SK2, and SK3 specifically for different controlling authorities. In this case, the controlling authorities may be those associated with public key Q1, Q2, and Q3, and that have performed a registration process similar to that described with respect to FIG. 3. Hence, the encrypted version of key part SK1 (which is shown as SK1x) may only be decrypted by the controlling authority associated with public key Q1; the encrypted version of key part SK2 (which is shown as SK2x) may only be decrypted by the controlling authority associated with public key Q2; and the encrypted version of key part SK3 (which is shown as SK3x) may only be decrypted by the controlling authority associated with public key Q3.

In some embodiments, encrypting entity computer 501 may generate symmetric keys SK1s, SK2s, and SK3s to utilize for encrypting each of key parts SK1, SK2, and SK3, respectively. Symmetric keys SK1s, SK2s, and SK3s may be generated using ECDH and a KDF on the one-time private key d_es and the public key associated with the corresponding controlling authority. For example, SK1s may be generated using ECDH and a KDF on one-time private key d_es and public key Q1 associated with a first controlling authority, SK2s may be generated using ECDH and a KDF on one-time private key d_es and public key Q2 associated with a second controlling authority, and SK3s may be generated using ECDH and a KDF on one-time private key d_es and public key Q3 associated with a third controlling authority. The KDF may be used to convert the result of ECDH into a symmetric key that it is compatible for use with the Advanced Encryption Standard (AES).

Controlling authority identifiers 510B may identify the controlling authorities for which encrypted key parts 510A are encrypted. Controlling authority identifiers 510B may be included as part of the metadata in the header of message 510. Controlling authority identifiers 510B may include any suitable information that indicates the appropriate controlling authorities that are authorized to decrypt an encrypted key part from encrypted key parts 510A. In some embodiments, controlling authority identifiers 510B may comprise hashes of the public keys associated with the controlling authorities. For example, controlling authority identifiers 510B may include a hash of public key Q1 to identify the first controlling authority, a hash of public key Q2 to identify the second controlling authority, and a hash of public key Q3 to identify the third controlling authority. In some embodiments, controlling authority identifiers 510B may include URLs that route to corresponding controlling authorities.

Authentication policy information 510C may comprise information indicating whether certain entities are authorized to decrypt an encrypted key part. In some embodiments, authentication policy information 510C may include information indicating entities authorized or not authorized to decrypt encrypted key parts (e.g., white list or black list). Authentication policy information 510C may also include information indicating credential types, claims, and validation methods that are acceptable for authentication or authorization of the entities. In some cases, authentication policy information 510C may include different information associated with each encrypted key part. Accordingly, information in authentication policy information 510C may be defined by negotiations between encrypting entity computer 501 and controlling authorities corresponding to each encrypted key part.

Public key certificate 510D may be associated with encrypting entity computer 501. Public key certificate 510D may be included as part of the metadata in the header of message 510. Public key certificate 510D may include one-time public key Q_es, which may be generated specifically for message 510. Public key certificate 510D including public key Q_es may enable target device 502 and other entities to verify that message 510 was generated by encrypting entity computer 501, where message 510 may be digitally signed by encrypting entity computer 501 using private key d_es.

Message authentication code 510F may include information that can be utilized by target device 502 to authenticate message 510. In some embodiments, message authentication code 510F may be generated using authenticated encryption with associated data (AEAD) based on symmetric key SKts. When target device 502 generates symmetric key SKts (see FIG. 12), it can generate a message authentication code using any suitable MAC algorithm based on message 510 and utilizing symmetric key SKts. If the generated message authentication code matches message authentication code 510F, this can ensure that message 510 was sent by encrypting entity computer 501 and that message 510 has not been altered during transmission.

Target device 502 may obtain message 510 from encrypting entity computer 501. Target device 502 may be able to view information included in the header of message 510, which may include encrypted key parts 510A, controlling authority identifiers 510B, authentication policy information 510C, and public key certificate 510D. However, since target device 502 does not have enough information to decrypt all of encrypted key parts 510A, it will not be able to reconstruct symmetric key SKts. Hence, target device 502 will not be able to decrypt encrypted payload 510E on its own. Target device 502 may request authorization to decrypt message 510 by routing message 510. Target device 502 may route message 510 to the controlling authorities indicated by controlling authority identifiers 510B via an intermediary computer, a process which is described in further detail with respect to at least FIG. 6 and FIG. 7.

C. Data Encryption Control for Claimant

In some embodiments, the target device may be a claimant device associated with a claimant. The claimant may be the requesting entity requesting decryption of the encrypted message or an entity requesting decryption of the encrypted message on behalf of the requesting entity. The claimant may request authorization to decrypt the encrypted message to multiple controlling authorities via an intermediary computer associated with an intermediary entity.

Figure 6:
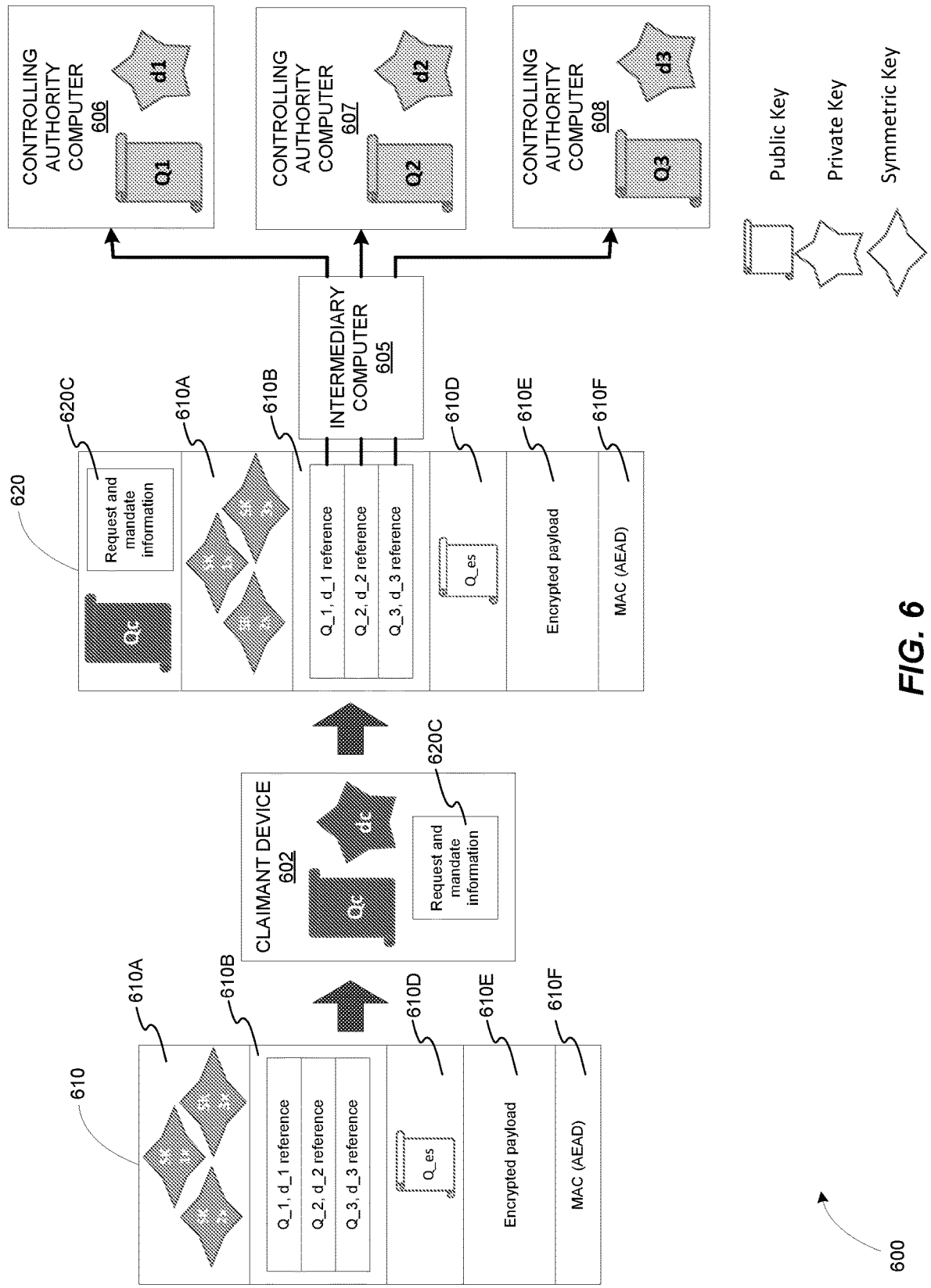
FIG. 6 shows an exemplary process flow for a claimant requesting to decrypt a message according to embodiments of the invention.

FIG. 6 shows an exemplary process flow 600 for a claimant requesting to decrypt a message according to embodiments of the invention. FIG. 6 includes a claimant device 602 associated with a claimant and that receives a message 610. In some embodiments, claimant device 602 may be similar to target device 502 of FIG. 5. FIG. 6 also includes a message 620, which is sent to an intermediary computer 605. Intermediary computer 605 may be associated with an intermediary entity, such as a broker, that is in communication with a plurality of controlling authority computers, such as controlling authority computer 606, controlling authority computer 607, and controlling authority computer 608. Controlling authority computer 606 may be associated with public key Q1 and private key d1, controlling authority computer 607 may be associated with public key Q2 and private key d2, and controlling authority computer 608 may be associated with public key Q3 and private key d3.

Message 610 may comprise encrypted key parts 610A, controlling authority identifiers 610B, a public key certificate 610D, an encrypted payload 610E, and a message authentication code 610F, which may have similar properties to those of encrypted key parts 510A, controlling authority identifiers 510B, public key certificate 510D, encrypted payload 510E, and message authentication code 510F of FIG. 5, respectively. For example, encrypted payload 610E may be encrypted using symmetric key SKts (see FIG. 5) and encrypted key parts 610A may comprise key parts of SKts encrypted specifically for controlling authority computers 606, 607, and 608. In some embodiments, message 610 may include a URL that routed to intermediary computer 605.

Claimant device 602 may modify message 610 to generate message 620. Claimant device 602 may be associated with a key pair including a public key Qc and a private key dc, as well as possess request and mandate information 620C. In some cases, claimant device 602 may add public key Qc and request and mandate information 620C to the header of message 610 to generate message 620. Request and mandate information 620C may indicate that claimant device 602 is authorized to request decryption of message 620. In some embodiments, claimant device 602 may utilize the URL in message 610 to send message 620 to intermediary computer 605 with a request to forward message 620 to controlling authority computers 606, 607, and 608.

Intermediary computer 605 may receive message 620 from claimant device 602 and process message 620. In some embodiments, intermediary computer 605 may verify message 620 using public key Qc. Additionally, intermediary computer 605 may process request and mandate information 620C to determine whether claimant device 602 is authorized to request decryption of encrypted payload 610E. For example, intermediary computer 605 may check that request and mandate information 620C accurately indicates identification information associated with claimant device 602 and includes an authentic mandate (e.g., issued by a judge).

If message 620 is verified, intermediary computer 605 may send message 620 to controlling authority computers 606, 607, and 608. Intermediary computer 605 may identify the controlling authority computers to which to send message 620 based on controlling authority identifiers 610B. In this case, controlling authority identifiers 610B may identify that message 620 is to be sent to controlling authority computers 606, 607, and 608. Each of controlling authority computers 606, 607, and 608 may process a received message, which is described in more detail with respect to FIG. 7.

Figure 7:
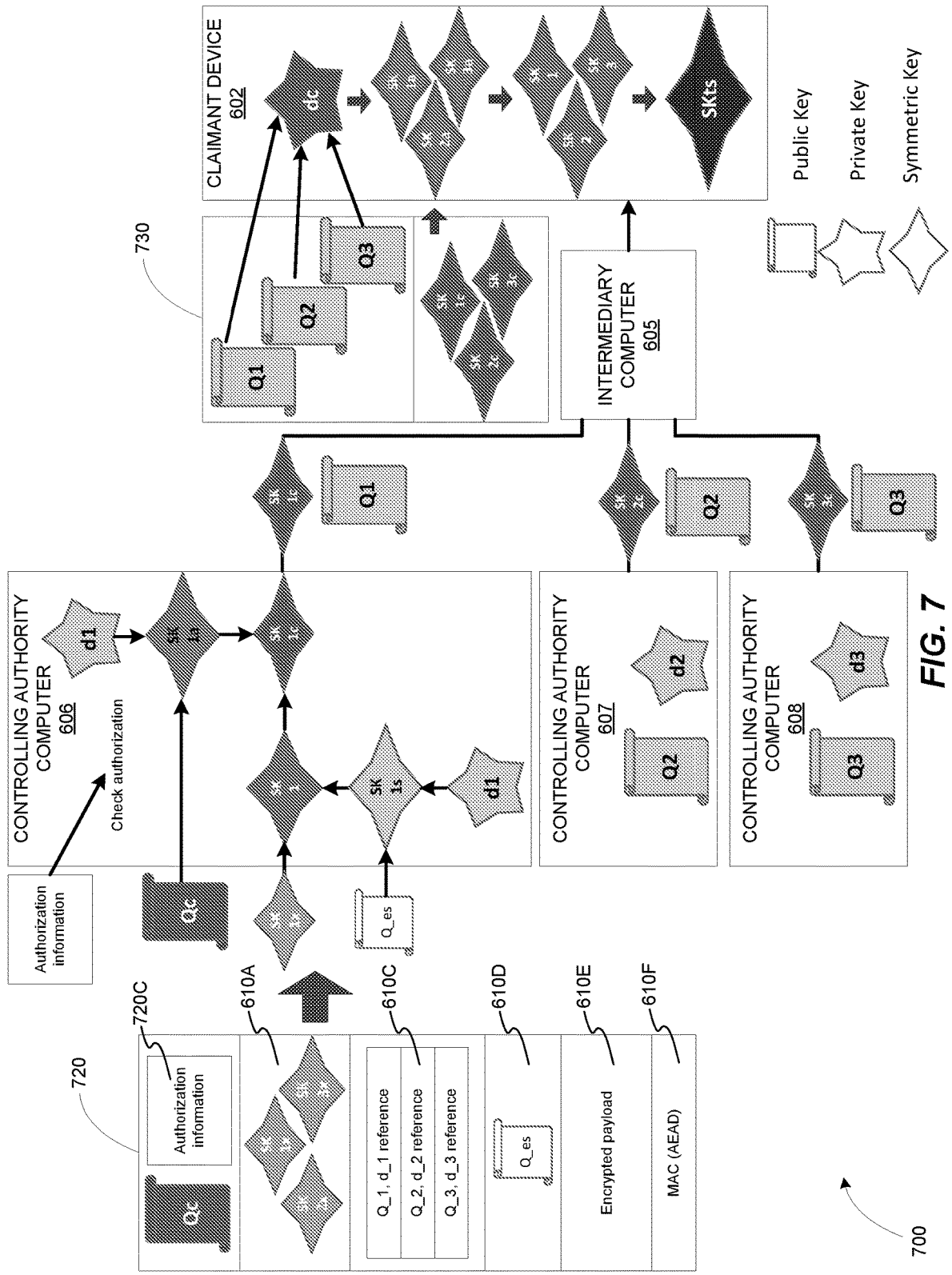
FIG. 7 shows an exemplary process flow for multi-party data encryption control according to embodiments of the invention.

FIG. 7 shows an exemplary process flow 700 for multi-party data encryption control according to embodiments of the invention. Certain portions of process flow 700 may be described with respect to components of FIG. 6. FIG. 7 includes a message 720, which includes authorization information 720C, that is sent to controlling authority computers 606, 607, and 608, which may each communicate with intermediary computer 605. Intermediary computer 605 may then communicate with claimant device 602.

While message 720 may comprise similar components to those of message 620 of FIG. 6, message 720 may also include authorization information 720C. Authorization information 720C may include information that indicates that claimant device 602 is authorized to request decryption of encrypted payload 610E. Intermediary computer 605 may include authorization information 720C in message 720 based on processing of request and mandate information 620C and determining that claimant device 602 is authorized to request decryption of encrypted payload 610E, as described with respect to FIG. 6. In some embodiments, message 720 may include authorization information 720C in addition to request and mandate information 620C or in place of request and mandate information 620C.

Each of controlling authority computers 606, 607, and 608 may process message 720 received from intermediary computer 605. While the processing of message 720 by controlling authority computer 606 is shown in detail in FIG. 7 for simplicity, it is understood that a similar process may be performed by controlling authority computer 607 and controlling authority computer 608. An exemplary process is described below with respect to controlling authority computer 606.

Controlling authority computer 606 may receive and process message 720. Controlling authority computer 606 may initially check authorization information 720C to ensure that claimant device 602 is authorized to request decryption of encrypted payload 610E. In some cases, if appropriate authorization is missing from message 720, controlling authority computer 606 may not proceed with further processing.

If authorization information 720C indicates successful authorization, controlling authority computer 606 may then decrypt encrypted key part SK1$x$ of encrypted key parts 610A. The encrypted key part SK1$x$ may be encrypted specifically for controlling authority computer 606. As described above with respect to FIG. 5, encrypted key part SK1$x$ may be a symmetric key generated by encrypting key part SK1 using a symmetric key SK1$s$ generated by an encrypting entity computer using ECDH (Elliptic curve Diffie-Hellman) and a KDF (a key derivation function) on the one-time private key d_es and the public key associated with controlling authority computer 606. Based on properties of ECDH, controlling authority computer 606 may also generate symmetric key SK1$s$ using ECDH and a KDF on the private key d1 associate with controlling authority computer 606 and the one-time public key Q_es. Controlling authority computer 606 may then decrypt encrypted key part SK1$x$ using the generated symmetric key SK1$s$ to obtain key part SK1.

In some embodiments, controlling authority computer 606 may re-encrypt key part SK1 specifically for claimant device 602. For example, controlling authority computer 606 may encrypt key part SK1 using a symmetric key SK1$a$. Symmetric key SK1$a$ may be generated using ECDH and a KDF on the public key Qc associated with claimant device 602 and private key d1 associated with controlling authority computer 606. The result of encrypting key part SK1 using symmetric key SK1$a$ may be encrypted key part SK1$c$, which may be encrypted specifically for claimant device 602.

A similar process may be performed by controlling authority computers 607 and 608. For example, controlling authority computer 607 may decrypt encrypted key part SK2$x$ to obtain key part SK2, and then may re-encrypt key part SK2 specifically for claimant device 602 to obtain encrypted key part SK2$c$. For controlling authority computer 607, the steps for which controlling authority computer 606 utilized its private key d1 may be replaced by private key d2 corresponding to controlling authority computer 607. Additionally, controlling authority computer 608 may decrypt encrypted key part SK3$x$ to obtain key part SK3, and then may re-encrypt key part SK3 specifically for claimant device 602 to obtain encrypted key part SK3$c$. For controlling authority computer 608, the steps for which controlling authority computer 606 utilized its private key d1 may be replaced by private key d3 corresponding to controlling authority computer 608.

Each of controlling authority computers may send an encrypted key part encrypted specifically for claimant device 602 as well as their corresponding public key to intermediary computer 605. For example, controlling authority computer 606 may send encrypted key part SK1c and public key Q1 to intermediary computer 605, controlling authority computer 607 may send encrypted key part SK2c and public key Q2 to intermediary computer 605, and controlling authority computer 608 may send encrypted key part SK3c and public key Q3 to intermediary computer 605. Accordingly, intermediary computer 605 may aggregate encrypted key parts SK1c, SK2c, and SK3c, as well as public keys Q1, Q2, and Q3. In some embodiments, intermediary computer 605 may send a message 730 comprising encrypted key parts SK1c, SK2c, and SK3c, as well as public keys Q1, Q2, and Q3 to claimant device 602.

Claimant device 602 may receive and process message 730. Claimant device 602 may decrypt encrypted key parts SK1c, SK2c, and SK3c using symmetric keys SK1a, SK2a, SK3a. Based on properties of ECDH, claimant device 602 may generate the symmetric keys SK1a, SK2a, and SK3a using ECDH and a KDF on the public key of the corresponding controlling authority and the private key dc of claimant device 602. For example, claimant device 602 may generate symmetric key SK1a using ECDH and a KDF on public key Q1 associated with controlling authority computer 606 and private key dc of claimant device 602, symmetric key SK2a using ECDH and a KDF on public key Q2 associated with controlling authority computer 607 and private key dc of claimant device 602, and symmetric key SK3a using ECDH and a KDF on public key Q3 associated with controlling authority computer 608 and private key dc of claimant device 602.

Claimant device 602 may then generate symmetric key SKts. Decrypting encrypted key parts SK1c, SK2c, and SK3c using symmetric keys SK1a, SK2a, and SK3a may result in key parts SK1, SK2, and SK3, which are combinable to generate symmetric key SKts. Claimant device 602 may combine key parts SK1, SK2, and SK3 in a suitable manner to generate symmetric key SKts. Claimant device 602 may then utilize symmetric key SKts to decrypt encrypted payload 610E.

Encrypting key parts SK1, SK2, and SK3 specifically for claimant device 602 to generate encrypted key parts SK1c, SK2c, and SK3c provides an additional layer of security. This ensures that no other entity besides claimant device 602 can access key parts SK1, SK2, and SK3, which are combinable to generate symmetric key SKts. For example, intermediary computer 605 is not able to decrypt encrypted key parts SK1c, SK2c, and SK3c and thus cannot generate key parts SK1, SK2, and SK3. Further, a malicious entity that intercepts communication between intermediary computer 605 and controlling authority computers or between intermediary computer 605 and claimant device 602 also cannot decrypt encrypted key parts SK1c, SK2c, and SK3c and thus cannot obtain key parts SK1, SK2, and SK3. Accordingly, encrypting key parts SK1, SK2, and SK3 specifically for claimant device 602 can prevent entities besides claimant device 602 from potentially being able to decrypt encrypted payload 610E.

While not shown in FIG. 7, in some embodiments, one or more controlling authority computers may choose not to send intermediary computer 605 an encrypted key part. The reason for this decision may include ethical, social, or legal reasons. As a result, intermediary computer 605 may not be able to aggregate enough encrypted parts to send to claimant device 602 so that claimant device 602 can regenerate symmetric key SKts. In an exemplary case, all three key parts SK1, SK2, and SK3 may be needed to generate symmetric key SKts. Hence, if any of controlling authority computer 606, 607, or 608 does not send encrypted key part SK1c, SK2c, or SK3c, respectively, to intermediary computer 605, claimant device 602 may not be able to obtain symmetric key SKts.

In another exemplary case, at least two key parts from key parts SK1, SK2, and SK3 may be needed to generate symmetric key SKts. This may be the case if a threshold scheme is utilized when initially splitting symmetric key SKts into key parts (see FIG. 5), so that two or more key parts are combinable to generate symmetric key SKts. In this case, even if a controlling authority computer out of controlling authority computers 606, 607, and 608 does not send an encrypted key part to intermediary computer 605, claimant device 602 may still be able to receive enough information from intermediary computer 605 so that it can generate symmetric key SKts. For example, claimant device may receive any combination of two key parts from encrypted key parts SK1c, SK2c, and SK3c (SK1c and SK2c, SK1c and SK3c, SK2c and Sk3c), or all three key parts SK1C, SK2c, and SK3c and combine the received key parts to generate symmetric key SKts.

Embodiments provide several advantages. For example, embodiments provide a system with checks and balances to ensure that a decision to allow a third party to recover encrypted data cannot be made easily. The decision relies on input by multiple controlling authorities and thus enables the power to decide whether to allow recovery of encrypted data to be mitigated amongst multiple entities. Since no single entity can make the decision on its own, it is understood that the ethical, social, legal, and other implications are thoroughly considered from multiple perspectives before the decision is finalized. Additionally, having this system in place may set a standard procedure to perform for in a situation in which a third party requests to decrypt encrypted data. This can reduce timely and costly debate in courts over whether the third party should be allowed to decrypt the encrypted data.

IV. Data Encryption Control without Access to Target Certificate

In some embodiments, the encrypting entity may not have access to a certificate including the public key associated with the entity requesting authorization to decrypt encrypted data. In this manner, the requesting entity can effectively be a target device, without the encrypting entity needing to know the public key of the target device. Further, embodiments can enable the requesting entity to decrypt encrypted data in real-time with complete privacy.

A. Authorizing Target to Obtain Message Key Parts

Figure 8:
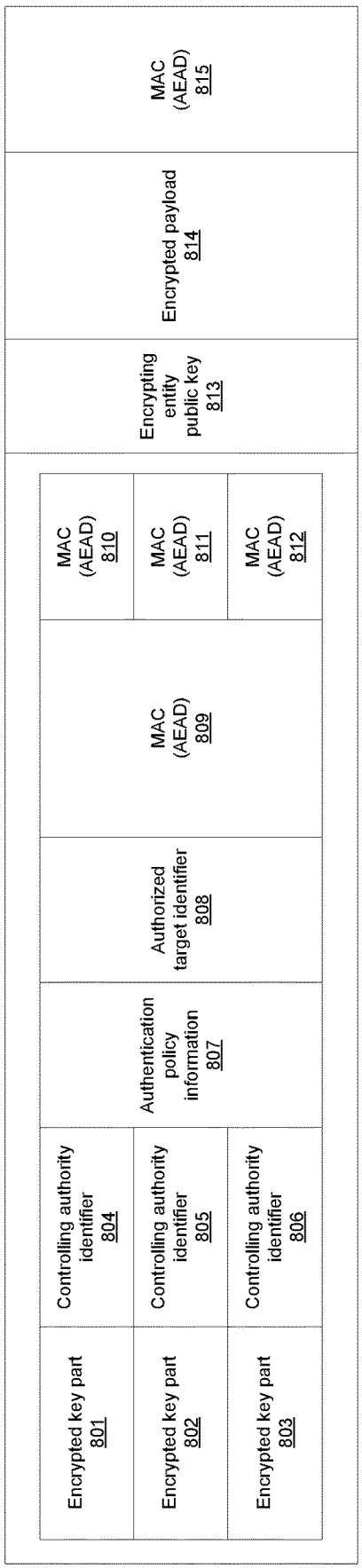
FIG. 8 shows an exemplary message enabling authorization of a target to obtain message key parts according to embodiments of the invention.

FIG. 8 shows an exemplary message 800 enabling authorization of a target to obtain key parts according to embodiments of the invention. Message 800 includes encrypted key parts 801, 802, and 803, controlling authority identifiers 804, 805, and 806, authentication policy information 807, authorized target identifier 808, a message authentication code 809, additional message authentication codes 810, 811, and 812, encrypting entity public key 813, encrypted payload 814, and a message authentication code 815.

Message 800 may include some features similar to messages described above with respect to FIG. 5-7. For example, encrypted payload 814 may be encrypted using a symmetric key. Encrypted key parts 801, 802, and 803 may include key parts of the symmetric key encrypted specifically for a plurality of controlling authorities. Each of the plurality of controlling authorities can be identified based on controlling authority identifiers 804, 805 and 806, which may each include a hash value of the public key associated with the corresponding controlling authority. Authentication policy information 807 may indicate information surrounding the data encryption control process (e.g., mandate). Encrypting entity public key 813 may be the public key associated with the encrypting entity that generated encrypted payload 814.

Message 800 may further comprise message authentication codes. Some message authentication codes (e.g., MAC 809, MAC 815) may be generated using the symmetric key utilized to encrypt encrypted payload 814. This enables a target device that successfully regenerates the symmetric key to be able to authenticate message 800 based on the message authentication code. No other third party entities may be able to regenerate the symmetric key. Some message authentication codes (e.g., MAC 810, MAC 811, MAC 812) may be generated using a symmetric key known only to a controlling authority. For example, the symmetric key may be generated using the controlling authority's private key. This enables a controlling authority computer that successfully generates the symmetric key to be able to authenticate message 800 based on the message authentication code.

While message 800 depicts a case in which there are three controlling authority identifiers corresponding to three controlling authority computers that are to receive message 800, embodiments are not so limited. In other cases, message 800 may include additional encrypted key parts, controlling authority identifiers, and message authentication codes corresponding to any suitable number of controlling authorities.

Figure 9:
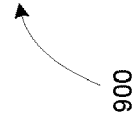
FIG. 9 shows an exemplary message enabling private authorization of a target to obtain message key parts according to embodiments of the invention.

FIG. 9 shows an exemplary message 900 enabling private authorization of a target to obtain key parts according to embodiments of the invention. Message 900 differs from message 800 of FIG. 8 in that it enables a target device to decrypt message 900 with complete privacy due to encryption techniques utilized for certain portions of the message.

Message 900 may include some components similar to those in message 800. For example, encrypted key parts 901, 902, and 903 may be similar to encrypted key parts 801, 802, and 803 of message 800 and controlling authority identifiers 904, 905, and 905 may be similar to controlling authority identifiers 804, 805, and 805 of message 800. Encrypting entity public key 919 may be similar to encrypting entity public key 813 and encrypted payload 920 may be similar to encrypted payload 814. Additionally, MAC 913 may be similar to MAC 809, MAC 921 may be similar to 815, and MACs 916, 917, and 918 may be similar to MACs 810, 811, and 812.

Message 900 may include some components similar to message 800 that are further encrypted for privacy. For example, encrypted authentication policy information 907, 908, and 909 may be encrypted versions of authentication policy information 807, encrypted specifically for the three controlling authorities corresponding to controlling authority identifiers 904, 905, and 906. Similarly, encrypted authorized target identifiers 910, 911, and 912 may be encrypted versions of authorized target identifier 808, encrypted specifically for the three controlling authorities corresponding to controlling authority identifiers 904, 905, and 906.

Message 900 may enable authorization to decrypt message 900 to be conducted privately. The encrypting entity that generates message 900 does not need to have a public key certificate or other cryptographic information associated with the target entity requesting decryption to securely perform multi-party data encryption control of message 900. Further, a second channel or shared secret between the encrypting entity and the target entity also does not need to be utilized.

B. Message Generation by Encrypting Entity

Figure 10:
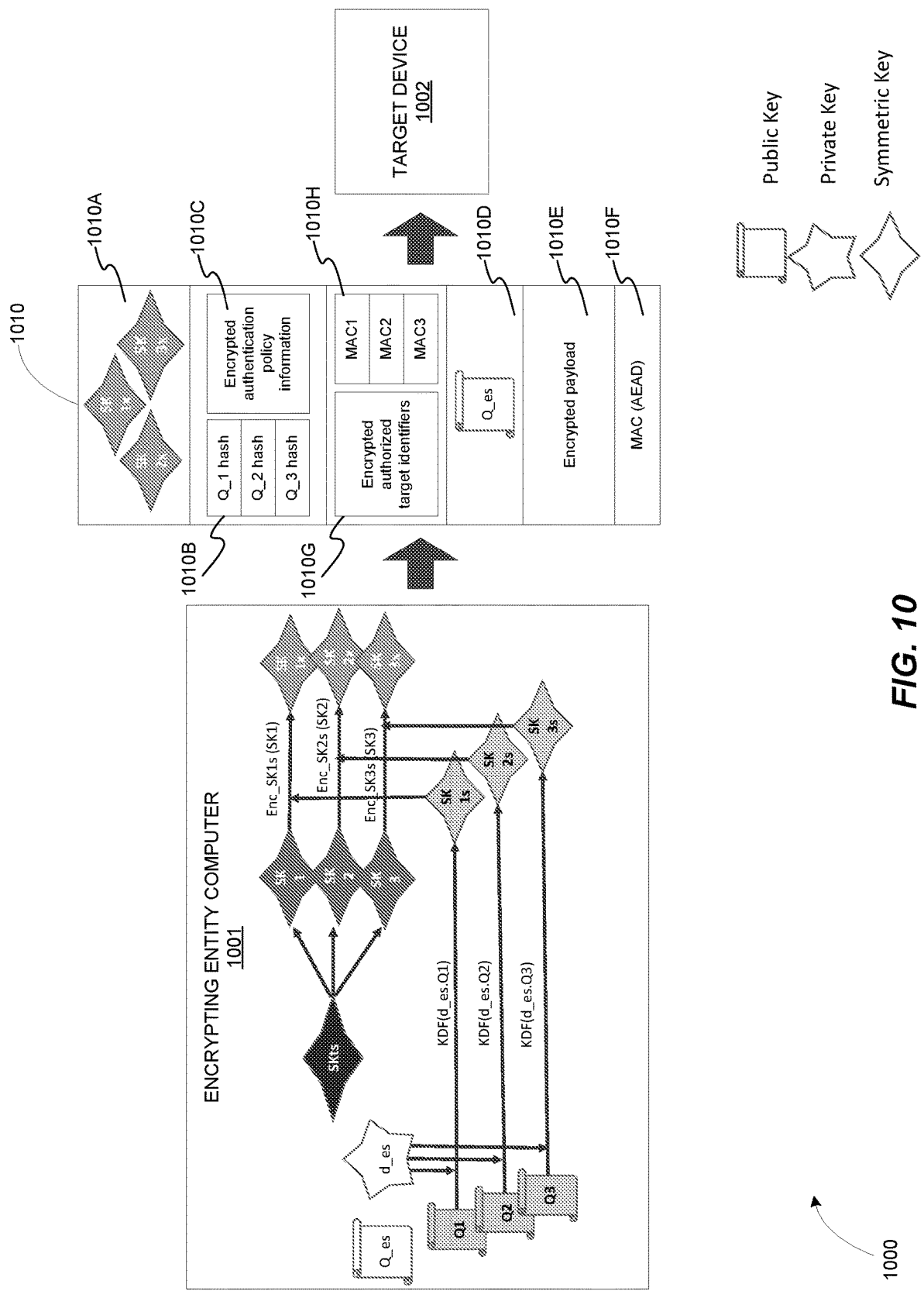
FIG. 10 shows an exemplary process flow for generating an encrypted message without knowledge of a target certificate according to embodiments of the invention.

FIG. 10 shows an exemplary process flow 1000 for generating an encrypted message without knowledge of a target certificate according to embodiments of the invention. FIG. 10 includes an encrypting entity computer 1001 and target device 1002. Encrypting entity computer 1001 may encrypt the message and may be associated with the entity that sends the encrypted message. Target device 1002 may be associated with the entity requesting to decrypt the encrypted message. Target device 1002 may not be known to be associated with any keys at this time.

FIG. 10 also includes an exemplary message 1010 generated by encrypting entity computer 1001. Several components of message 1010 may be similar to those of message 510 shown in FIG. 5. For example, encrypted key parts 1010A, controlling authority identifiers 1010B, public key certificate 1010D, encrypted payload 1010E, and message authentication code 1010F may be similar to encrypted key parts 510A, controlling authority identifiers 510B, public key certificate 510D, encrypted payload 510E, and message authentication code 510F of FIG. 5. In addition, message 1010 may include encrypted authorized target identifiers 1010G and message authentication codes 1010H. Encrypted payload 1010E may be encrypted using symmetric key SKts (see FIG. 5).

Encrypted authorized target identifiers 1010G may be encrypted identification information associated with target device 1002. The identification information may not be related cryptographic information, such as keys, related to target device 1002. For example, the identification information may be an email address, a phone number, or a device identifier associated with target device 1002.

Encrypted authentication policy information 1010C may be encrypted authentication policy information. In some embodiments, encrypted authentication policy information 1010C may be an encrypted version of information similar to that of authentication policy information 510C of FIG. 5.

Encrypted authorized target identifiers 1010G and encrypted authentication policy information 1010C may be encrypted specifically for the controlling authorities corresponding to controlling authority identifiers 1010B. While FIG. 10 does not explicitly show separate encrypted authorized target identifiers and encrypted authentication policy information for simplicity, it is understood that message 1010 may include an encrypted authorized target identifier and encrypted authentication policy information for each of the three controlling authorities corresponding to controlling authority identifiers 1010B (see message 900 of FIG. 9).

Message authentication codes 1010H may include information that can be utilized by a plurality of controlling authorities to authenticate message 1010. In some embodiments, message authentication codes 1010H may be generated using authenticated encryption with associated data (AEAD) based on symmetric keys SK1$s$, SK2$s$, and SK3$s$. A controlling authority computer associated with public key Q1 may correspond to symmetric key SK1$s$, a controlling authority computer associated with public key Q2 may correspond to symmetric key SK2$s$, and a controlling authority computer associated with public key Q3 may correspond to symmetric key SK3$s$.

When each controlling authority computer corresponding to symmetric keys SK1$s$, SK2$s$, and SK3$s$ receives message 1010 (see FIG. 11), it may generate a message authentication code using any suitable MAC algorithm based on message 1010 and utilizing their corresponding symmetric key. Each controlling authority computer may check whether the generated message authentication code matches the corresponding message authentication code in message authentication codes 1010H. If the generated message authentication code matches the corresponding message authentication code in message authentication codes 1010H, this can ensure that message 1010 was sent by encrypting entity computer 1001 and that message 1010 has not been altered during transmission.

Encrypting entity computer 1001 may encrypt key parts SK1, SK2, and SK3 of symmetric key SKts to generate encrypted key parts SK1$x$, SK2$x$, and SK3$x$. A similar process as that described with respect to FIG. 5 may be performed. However, symmetric key SKts may be generated in a different manner. Symmetric key SKts may not be generated using the public key associated with target device 1002, since it is not available in this case. Instead, symmetric key SKts may be generated using any other suitable method for key-generation that does not utilize the public key associated with target device 1002 as an input. For example, symmetric key SKts may be a randomly generated key that is not known to target device 1002.

C. Data Encryption Control for Target Device

Figure 11:
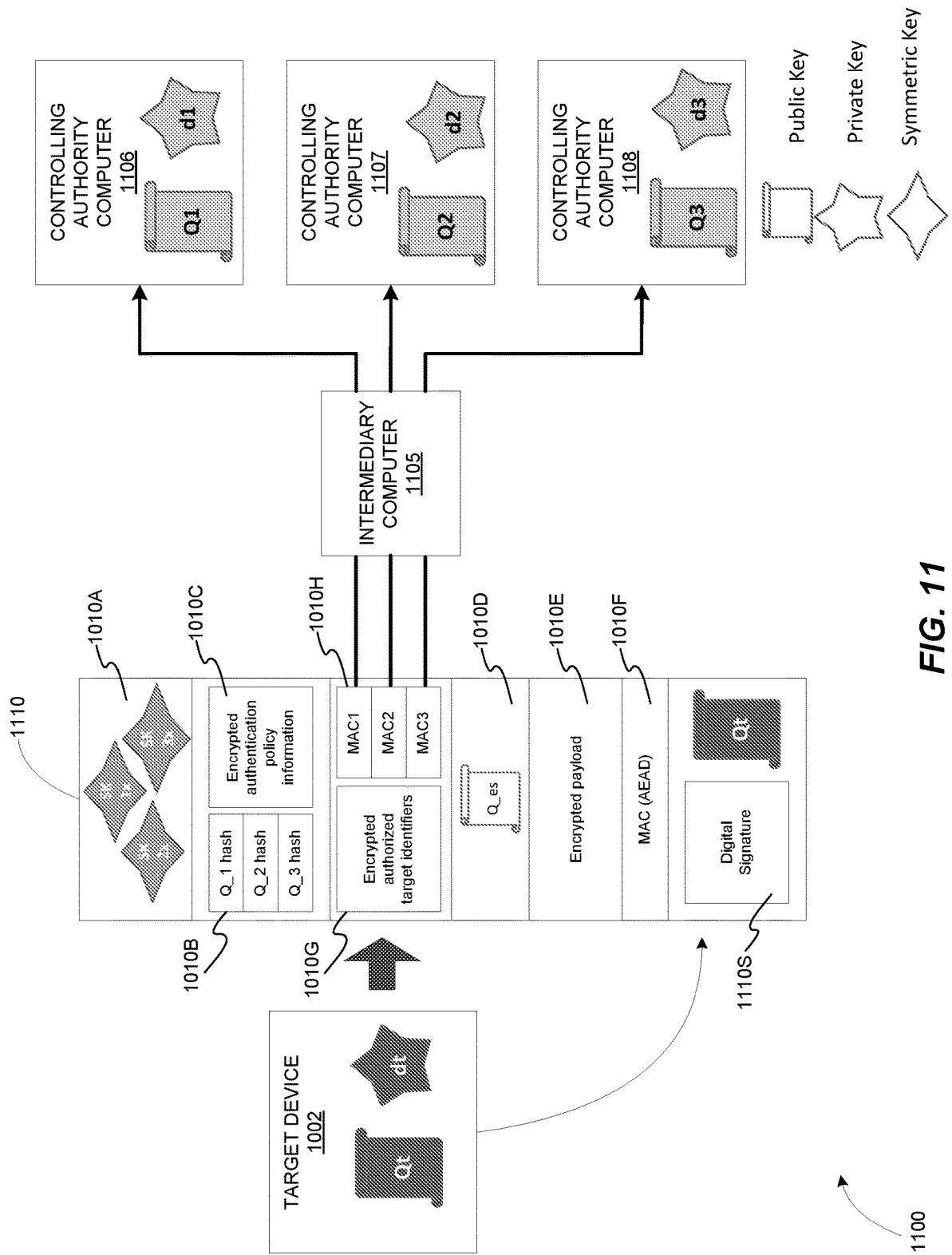
FIG. 11 shows an exemplary process flow for a target device requesting to decrypt a message according to embodiments of the invention.

FIG. 11 shows an exemplary process flow 1100 for a target device requesting to decrypt a message according to embodiments of the invention. FIG. 11 includes target device 1002, which generates message 1110 and sends it to an intermediary computer 1105. Intermediary computer 1105 may be associated with an intermediary entity, such as a broker, that is in communication with a plurality of controlling authority computers, such as controlling authority computer 1106, controlling authority computer 1107, and controlling authority computer 1108. Controlling authority computer 1106 may be associated with public key Q1 and private key d1, controlling authority computer 1107 may be associated with public key Q2 and private key d2, and controlling authority computer 1108 may be associated with public key Q3 and private key d3.

Message 1110 may comprise similar components to those of message 1010 of FIG. 10. In addition, message 1010 may include a digital signature 1110S and public key Qt associated with target device 1002. Digital signature 1110S may be verified using public key Qt. In some embodiments, message 1110 may be end-to-end encrypted.

Target device 1002 may send message 1110 to intermediary computer 1105, which may then forward message 1110 to a plurality of controlling authority computers. Target device 1002 may determine the appropriate authorities to which message 1110 is to be sent based on controlling authority identifiers 1010B. In this case, controlling authority identifiers 1010B may indicate that message 1110 is to be sent to controlling authority computer 1106, controlling authority computer 1107, and controlling authority computer 1108. Each of controlling authority computers 1106, 1107, and 1108 may process message 1110, a process which is described in further detail with respect to FIG. 12.

Figure 12:
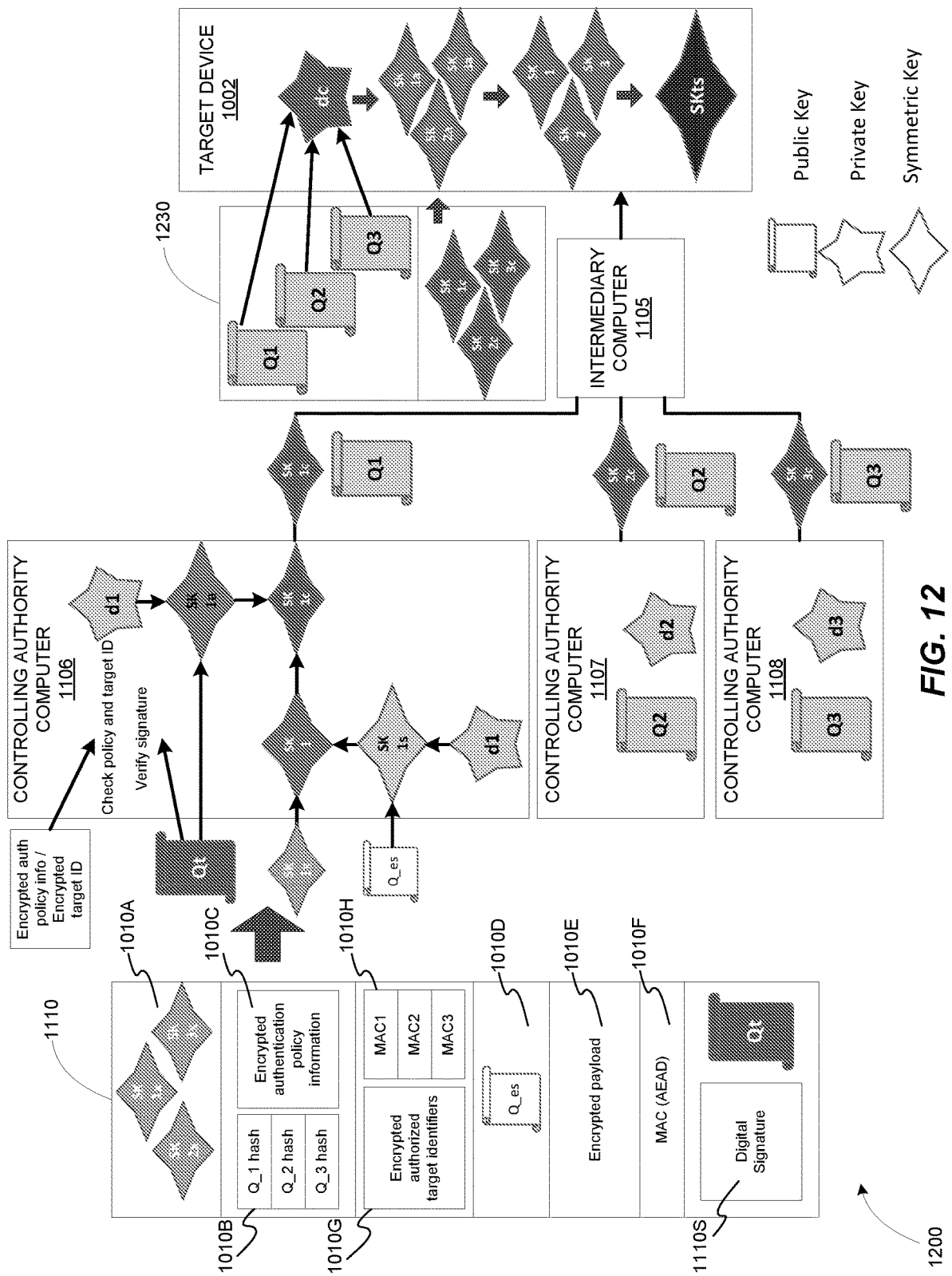
FIG. 12 shows an exemplary process flow for multi-party data encryption control according to embodiments of the invention.

FIG. 12 shows an exemplary process flow 1200 for multi-party data encryption control according to embodiments of the invention. Exemplary process flow 1200 may be similar to exemplary process flow 700 described with respect to FIG. 7. Further details regarding steps in process flow 1200 may be found in the description for process for 700. In this case, claimant device 602 may be target device 1002.

Some additional steps may be taken prior to decrypting encrypted key parts SK1$x$, SK2$x$, and SK3$x$ included in message 1110. For example, each of controlling authority computers 1106, 1107, and 1108 may decrypt relevant portions of encrypted authentication policy information 1010C and encrypted authorized target identifiers 1010G to determine that an encrypted key part is to be sent to target device 1002. Additionally, each of controlling authority computers 1106, 1107, and 1108 may verify digital signature 1110S using public key Qt to ensure that the request to decrypt originated from target device 1002.

Controlling authority computers 1106, 1107, and 1108 may then process message 1110. In this case, controlling authority computers 1106, 1107, and 1108 may each return an encrypted key part encrypted specifically for target device 1002 to intermediary computer 1105. Intermediary computer 1105 may forward the encrypted key parts and public keys associated with controlling authority computers 1106, 1107, and 1108 to target device 1002. After receiving a sufficient number of key parts, target device 1002 may generate symmetric key SKts. Target device 1002 may then be able to decrypt encrypted payload 1010E using the symmetric key SKts.

Accordingly, embodiments of the invention enables secure multi-party data encryption control, even when the target certificate is not initially available. This allows for flexibility in cases in which the target certificate may not be obtained or may not be easily obtained. For example, in some cases, the target requesting authorization to decrypt may not want to provide their cryptographic information.

D. Organizing Controlling Authorities as a Network

Figure 13:
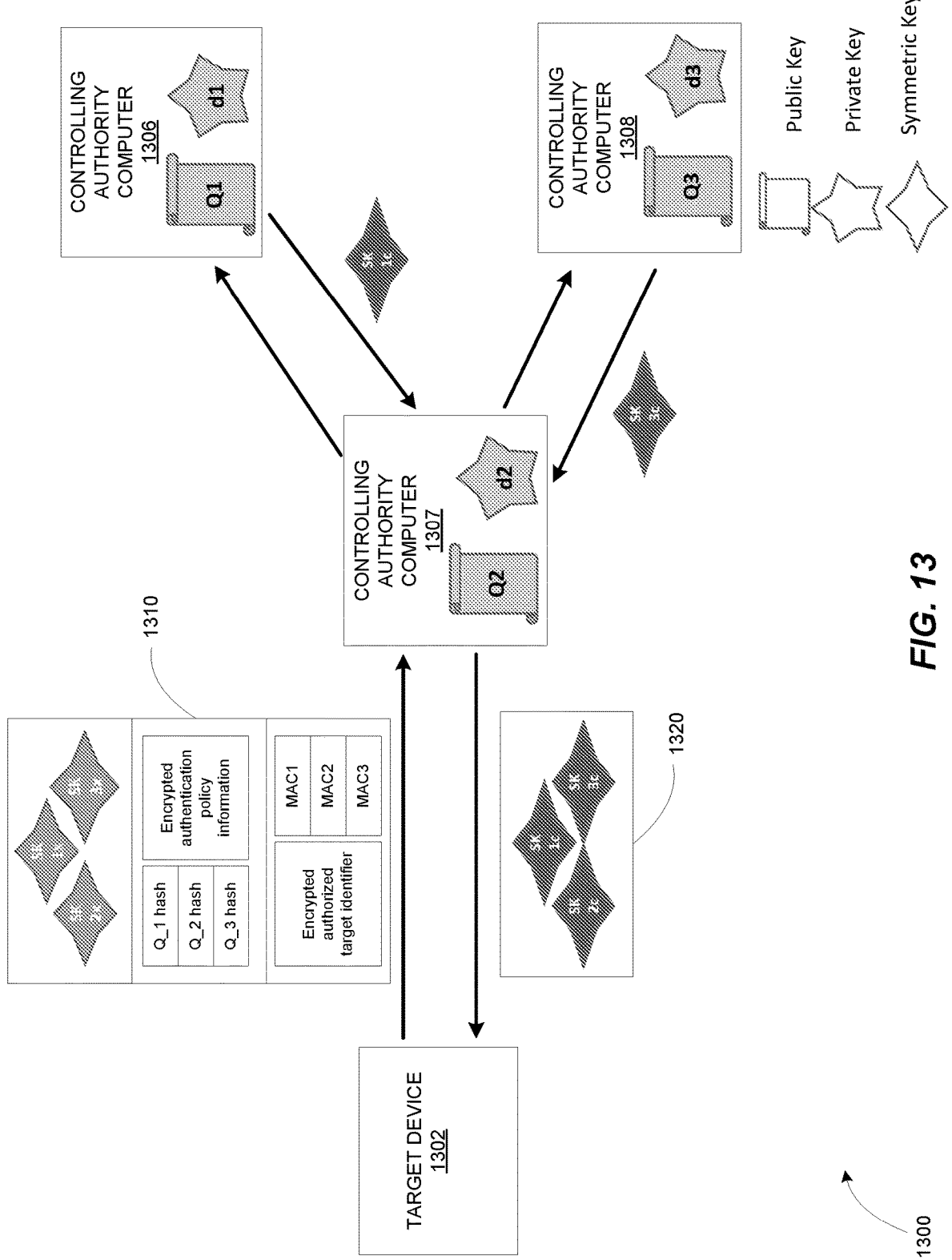
FIG. 13 shows an exemplary process flow for organizing controlling authorities as a network according to embodiments of the invention.

FIG. 13 shows an exemplary process flow 1300 for organizing controlling authorities as a network according to embodiments of the invention. Each controlling authority may be associated with a controlling authority computer. In some embodiments, one or more controlling authority computers may be configured to be a proxy for other controlling authority computers. It is understood that any controlling authority computers may be capable of serving as a proxy.

In one exemplary case, controlling authority computer 1307 may serve as a proxy for controlling authority computers 1306 and 1308. Target device 1302 may send message 1310 to controlling authority computer 1307, which may then forward message 1310 to controlling authority computer 1306 and controlling authority computer 1307.

Message 1310 serves as an exemplary message that may be utilized and thus is not restrictive. For example, certain components of message 1310 may not be shown in FIG. 13 for simplicity. Additionally, in some cases, certain components shown in message 1310 do not have to be included or encrypted as shown.

In some embodiments, the proxy may not forward message 1310 to controlling authority computers. In some implementations, the proxy may generate a different message for each of the controlling authority computers. For example, a message sent to controlling authority computer may include just the relevant encrypted key parts associated with the corresponding controlling authority, rather than all encrypted key parts.

Each of controlling authority computer 1306, 1307, and 1308 may process message 1310 using a process similar to that described with respect to at least FIG. 12. In some embodiments, controlling authority computer 1307 may generate an encrypted key part encrypted specifically for target device 1302 and send the encrypted key part with message 1310 to controlling authority computers 1306 and 1308. Controlling authority computers 1306 and 1308 may also process message 1310 to each generate an encrypted key part encrypted specifically for target device 1302. Controlling authority computer 1306 and controlling authority computer 1308 may each send their resulting encrypted key part to controlling authority computer 1307.

Controlling authority computer 1307 may then aggregate and send the encrypted key parts 1320 to target device 1302. Encrypted key parts 1320 may include the encrypted key part generated by controlling authority computer 1307, as well as the encrypted key parts received from controlling authority computers 1306 and 1308. Target device 1302 may decrypt encrypted key parts 1320, combine the obtained key parts to generate the symmetric key used to encrypt an encrypted payload in message 1310, and decrypt the encrypted payload using the generated symmetric key. It is noted that even if controlling authority computer 1307 aggregates the encrypted key parts 1320, it is not able to generate the symmetric key because it does not have enough information to decrypt encrypted key parts 1320. Thus, utilizing controlling authority computer 1307 as a proxy does not compromise the security of the multi-party data encryption control process.

In some embodiments, an intermediary computer may reside between target device 1302 and controlling authority computer 1307. The intermediary computer may be configured to be the proxy for the controlling authority computers. For example, target device 1302 may send message 1310 to the intermediary computer, which may then send appropriate information to each of the controlling authority computers 1306, 1307, and 1308. Each of the controlling authority computers 1306, 1307, and 1308 may generate an encrypted key part encrypted specifically for target device 1302 and send their encrypted key part to the intermediary computer. The intermediary computer may then aggregate and send the received encrypted key parts to target device 1302.

While embodiments in which all controlling authority computers return encrypted key parts to the proxy are described above, embodiments are not so limited. For example, in some cases, only a portion of the controlling authority computers may return encrypted key parts to the proxy. If the number of returned encrypted key parts is sufficient based on a threshold scheme (e.g., Shamir's Secret Sharing scheme), the target device may be able to combine the obtained key parts to generate the symmetric key used to encrypt an encrypted payload in message 1310.

V. Additional Use Cases

A. Controlling Encrypted Outbound Traffic

Embodiments of the invention enable filtering of outbound data without disrupting the experience of the target (e.g., recipient). For example, embodiments of the invention enable services for encrypting outgoing online traffic to various entities without knowledge of specific details about the recipient. Further, embodiments of the invention allow for decryption and monitoring of all of the encrypted traffic. End-to-end decryption may be preserved.

In an exemplary use case, a service provider that provides such services may encrypt data (e.g., files, emails, etc.) for an external recipient. The service provider may not know specific information (e.g., cryptographic information) related to the recipient. A monitoring service that may reside at the perimeter of the service provider may check the outgoing traffic from the service provider. The monitoring service may check the encrypted data by decrypting and blocking any inappropriate data before sending the encrypted data to its destination. The recipient may have to register with or authenticate to the service provider to be authorized to decrypt the encrypted data.

In some embodiments, the checks conducted by the monitoring service can ensure that encrypted data is encrypted in an appropriate manner. These checks may be conducted in periodic or random intervals. During a check, the monitor service may determine whether the encrypted data is being transmitted such that the data can be decrypted using systems and methods described according to embodiments of the invention. For example, the monitor service may check that a message comprising the encrypted data includes appropriate information to enable decryption of key parts by a plurality of controlling authorities. The monitoring service may allow encrypted data that can be decrypted in this manner to be transmitted. This can prevent transmission of encrypted data that is completely unable to be decrypted, which could cause issues for situations in which decryption is requested for urgent matters (e.g., matters pertaining to national security).

B. Protecting Data at Rest

Embodiments of the invention may be utilized to protest data at rest. In some cases, there may be sensitive data that is encrypted and stored for later use. An entity that requests to utilize the sensitive data may be able to request decryption of the data using methods and systems described herein.

In an exemplary case, a client application may need to decrypt encrypted data. The encrypted data may be encrypted using an encryption key. The client application may contact multiple encryption control service computers via an intermediary entity computer (e.g., associated with a broker). Each encryption control service computer may return a key part of the encryption key. The intermediary entity computer may send the returned key parts to the client application, which may then combine the key parts to generate the encryption key that can be utilized to decrypt the encrypted data. It is understood that in other cases, each encryption control service computer may instead return a key part encrypted specifically for the client application.

Embodiments of the invention are beneficial in the above use case. The risk of compromising the encrypted data at rest is reduced when performing multi-party encryption control because no single encryption control service computer has enough information to decrypt the encrypted data. Further, embodiments of the invention reduce costs and inconveniences associated with utilizing a HSM (hardware security module). In some cases, no central HSM may be needed. Instead, the information needed for decrypting the encrypted data may be split amongst various entities, which mitigates risk.

VI. Computer System

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems in a computer system may be interconnected via a system bus. Additional subsystems can include a printer, keyboard, storage device(s), monitor, which is coupled to a display adapter, and others. Peripherals and input/output (I/O) devices, which couple to an I/O controller, can be connected to the computer system by any number of means known in the art such as an input/output (I/O) port (e.g., USB, FireWire). For example, the I/O port or external interface (e.g. Ethernet, Wi-Fi, etc.) can be used to connect the computer system to a wide area network such as the Internet, a mouse input device, or a scanner. An interconnection via system bus can allow the central processor to communicate with each subsystem and to control the execution of instructions from system memory or the storage device(s) (e.g., a fixed disk, such as a hard drive, or optical disk), as well as the exchange of information between subsystems. The system memory and/or the storage device (s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed:

1. A method comprising performing, by a computer associated with an encrypting entity:
   generating a key for a message;
   generating N key parts of the key, N being an integer of at least two;
   for each of the N key parts, encrypting the key part using a trusted key of a corresponding controlling authority of a plurality of controlling authorities, wherein each controlling authority of the plurality of controlling authorities corresponds to one of the N key parts;
   generating the message including at least:
      a first portion including at least M of the encrypted key parts and identifiers of the plurality of controlling authorities, wherein each of the identifiers corresponds to one of the plurality of controlling authorities; and
      a second portion encrypted using the key; and
   sending the message, wherein at least M of the N key parts are combinable to generate the key such that the generated key is operable to decrypt the second portion of the message, M being an integer equal to or less than N.

2. The method of claim 1, wherein the key is a symmetric key generated using a private key of the encrypting entity and a public key associated with a target device.

3. The method of claim 2, wherein the key is a randomly generated key that is not known to the target device.

4. The method of claim 2, wherein encrypting the key part comprises:
   generating a symmetric key using the public key of the corresponding controlling authority and a private key of the encrypting entity; and
   encrypting the key part using the symmetric key.

5. The method of claim 1, wherein sending the message comprises sending the message to a target device, wherein the target device is a claimant device associated with a claimant that requests to decrypt the message.

6. The method of claim 1, wherein the message includes policy information, wherein the policy information comprises:
   information indicating entities authorized or not authorized to decrypt encrypted key parts, and
   information indicating credential types, claims, and validation methods that are acceptable for authentication or authorization of the entities.

7. The method of claim 1, wherein each of the identifiers of the plurality of controlling authorities includes a URL for routing to the corresponding controlling authority.

8. The method of claim 7, wherein the message is sent to computers associated with the plurality of controlling authorities corresponding to the at least M of the N key parts based on the identifiers of the plurality of controlling authorities.

9. A method comprising performing, by a target device:
   receiving a message including at least:
      a first portion including at least M encrypted key parts of a key generated for the message and identifiers of a plurality of controlling authorities, wherein each encrypted key part is encrypted using a trusted key of a corresponding controlling authority of the plurality of controlling authorities, wherein each controlling authority of the plurality of controlling authorities corresponds to one of the M encrypted key parts and one of the identifiers, and wherein a computer associated with an encrypting entity generates N key parts of the key, N being an integer of at least two and M being an integer equal to or less than N; and
      a second portion encrypted using the key;
   routing the message to one or more computers with a request to decrypt the message;
   receiving a plurality of re-encrypted key parts encrypted specifically for the target device, each re-encrypted key part encrypted by a corresponding controlling authority from the plurality of controlling authorities;
   decrypting at least M of the plurality of re-encrypted key parts to obtain at least M key parts;
   generating the key by combining the at least M key parts; and
   decrypting the second portion of the message using the generated key.

10. The method of claim 9, wherein decrypting the at least M of the plurality of re-encrypted key parts comprises:
    for each of the at least M of the plurality of re-encrypted key parts:
       generating a symmetric key using a private key associated with the target device and a public key of the corresponding controlling authority; and
       decrypting the re-encrypted key part using the symmetric key.

11. The method of claim 9, wherein routing the message comprises sending the message to a computer associated with a controlling authority from the plurality of controlling authorities with a request to send the message to a plurality of computers associated with the plurality of controlling authorities.

12. The method of claim 9, wherein routing the message comprises sending the message to an intermediary computer with a request to send the message to a plurality of computers associated with the plurality of controlling authorities.

13. A method comprising performing, by a computer associated with a controlling authority:
    receiving a message including at least:
       a first portion including at least M encrypted key parts of a key generated for the message and identifiers of a plurality of controlling authorities, wherein each encrypted key part is encrypted using a trusted key of a corresponding controlling authority of the plurality of controlling authorities, wherein each controlling authority of the plurality of controlling authorities corresponds to one of the M encrypted key parts and one of the identifiers, and wherein a computer associated with an encrypting entity generates N key parts of the key, N being an integer of at least two and M being an integer equal to or less than N; and
       a second portion encrypted using the key;
    decrypting an encrypted key part in the message to obtain a key part;
    re-encrypting the key part to generate a re-encrypted key part encrypted specifically for a target device; and
    sending the re-encrypted key part, wherein at least M of the N key parts of the key are combinable to generate the key such that the generated key is operable to decrypt the second portion of the message.

14. The method of claim 13, wherein decrypting the encrypted key part comprises:
    obtaining a private key of the corresponding controlling authority; and
    decrypting the encrypted key part using the private key.

15. The method of claim 13, wherein decrypting the encrypted key part comprises:
    generating a symmetric key using a public key of the encrypting entity and a private key of the controlling authority; and
    decrypting the encrypted key part using the symmetric key.

16. The method of claim 13, wherein re-encrypting the key part comprises:
    generating a symmetric key using a private key of the controlling authority and a public key associated with the target device; and
    re-encrypting the key part using the symmetric key.

17. The method of claim 13, wherein receiving the message comprises receiving the message from the target device, and wherein sending the re-encrypted key part comprises sending the re-encrypted key part to the target device.

18. The method of claim 13, wherein receiving the message comprises receiving the message from an intermediary computer, and wherein sending the re-encrypted key part comprises sending the re-encrypted key part to the intermediary computer.

19. The method of claim 13, wherein the computer is a first computer and the controlling authority is a first controlling authority, and wherein receiving the message comprises received the message from a second computer associated with a second controlling authority and sending the re-encrypted key part comprise sending the re-encrypted key part to the second computer associated with second controlling authority.

20. The method of claim 13, wherein the method further comprises:
    sending the message to a plurality of computers associated with the plurality of controlling authorities;
    receiving at least M−1 re-encrypted key parts encrypted specifically for the target device from the plurality of computers associated with the plurality of controlling authorities; and sending the re-encrypted key part and the received at least M−1 re-encrypted key parts to the target device.

* * * * *